US012669901B2

(12) United States Patent
Lee et al.

(10) Patent No.: US 12,669,901 B2
(45) Date of Patent: Jun. 30, 2026

(54) DISPLAY MODULE, MOBILITY DEVICE INCLUDING THE SAME, AND ELECTRONIC DEVICE INCLUDING THE SAME

(71) Applicant: SAMSUNG DISPLAY CO., LTD., Yongin-si (KR)

(72) Inventors: Il Ho Lee, Yongin-si (KR); Seungrok Lee, Yongin-si (KR); Eungkwan Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/181,862

(22) Filed: Apr. 17, 2025

(65) Prior Publication Data

US 2026/0037089 A1 Feb. 5, 2026

(30) Foreign Application Priority Data

Aug. 5, 2024 (KR) ........................ 10-2024-0103553

(51) Int. Cl.
*G06F 3/041* (2006.01)
*B60K 35/10* (2024.01)
*G06F 3/044* (2006.01)

(52) U.S. Cl.
CPC ........ *G06F 3/04184* (2019.05); *G06F 3/0443* (2019.05); *B60K 35/10* (2024.01);
(Continued)

(58) Field of Classification Search
CPC ............... G06F 3/14184; G06F 3/0443; G06F 2203/04111; B60K 35/10
See application file for complete search history.

(56) References Cited

U.S. PATENT DOCUMENTS 11,132,085 B2 * 9/2021 Yang .................... G09G 3/3225
11,789,566 B2 * 10/2023 Cho .................... G06F 3/04184
345/174

(Continued)

FOREIGN PATENT DOCUMENTS

KR 10-2022-0056312 A 5/2022
KR 10-2022-0099031 A 7/2022
KR 10-2023-0063924 A 5/2023

*Primary Examiner* — Ariel A Balaoing
(74) *Attorney, Agent, or Firm* — F. CHAU & ASSOCIATES, LLC

(57) ABSTRACT

A display module and an electronic device including the same includes a display panel. An input sensor circuit disposed on the display panel includes a plurality of transmittance channels and a plurality of receiver channels. Each of first transmittance channels among the plurality of transmittance channels is applied with a first electrical signal having a first electric potential that is greater than a standard electric potential by a first value, each of second transmittance channels is applied with a second electrical signal, and each of third transmittance channels is applied with a third electrical signal having a third electric potential that is less than the standard electric potential by a second value. The second value is greater than the first value. First capacitors between the first transmittance channels and the display panel are configured to store a first energy, second capacitors between the second transmittance channels and the display panel are configured to store a second energy. Third capacitors between the third transmittance channels and the display panel are configured to store a third energy. A sum of the first energy and the second energy divided by the third energy. is 0.95 or greater and 1.05 or less.

20 Claims, 15 Drawing Sheets

(52) U.S. Cl.
CPC ................ *B60K 2360/1438* (2024.01); *G06F 2203/04111* (2013.01)

(56) References Cited

U.S. PATENT DOCUMENTS

| | | | | |
|---|---|---|---|---|
| 2010/0182273 | A1* | 7/2010 | Noguchi | G06F 3/0445 |
| | | | | 345/173 |
| 2014/0313138 | A1* | 10/2014 | Jeong | G06F 3/0412 |
| | | | | 345/173 |
| 2017/0242502 | A1* | 8/2017 | Gray | G06F 3/04162 |
| 2018/0113549 | A1* | 4/2018 | Park | G06F 3/03545 |
| 2018/0181243 | A1* | 6/2018 | Tsunashima | G06F 3/0412 |
| 2020/0312248 | A1* | 10/2020 | Shin | G09G 3/3291 |

* cited by examiner

DISPLAY MODULE, MOBILITY DEVICE INCLUDING THE SAME, AND ELECTRONIC DEVICE INCLUDING THE SAME

CROSS-REFERENCE TO RELATED APPLICATIONS

This application claims priority to and benefits of Korean Patent Application No. 10-2024-0103553 under 35 U.S.C § 119, filed on Aug. 5, 2024, in the Korean Intellectual Property Office, the contents of which are incorporated by reference herein in its entirety.

BACKGROUND

1. Technical Field

One or more embodiments described herein relates to a display module, and an electronic device including a display module.

2. Description of the Related Art

Most vehicles sold today have displays mounted in or on their dashboards. A display mounted in a vehicle (or other type of mobility device) may display larger size images than medium to small size displays, such as smartphones, smart watches and tablet PCs. In operation, the display of the mobility device should accurately detect a touch region by a user while driving and even when the user is wearing a glove of a thick material. One approach for satisfying this type of high-performance touch function is to increase the driving voltage or signal frequency applied to the touch electrodes of the display.

However, increasing the driving voltage or signal frequency applied to the touch electrodes may produce a proportional increased Electromagnetic Interference (EMI) emitted by the display. Additionally, the increased EMI may affect other electronic parts within the mobility device and cause them to malfunction.

SUMMARY

A display module according to an embodiment of the present disclosure may include a display panel and an input sensor circuit. The input sensor circuit may be disposed on the display panel and include a plurality of transmittance channels and a plurality of receiver channels. Each of the plurality of transmittance channels may extend in a first direction, and the plurality of transmittance channels may be arranged in a second direction intersecting with the first direction. Each of the plurality of receiver channels may extend in the second direction, and the plurality of receiver channels may be arranged in the first direction.

Each of first transmittance channels among the plurality of transmittance channels may be applied with a first electrical signal having a first electric potential that is greater than a standard potential at a first point by a first value. Each of second transmittance channels adjacent to the first transmittance channels among the plurality of transmittance channels is applied with a second electrical signal having a second electric potential different from the first electric potential. Each of some of third transmittance channels adjacent to the second transmittance channels among the plurality of transmittance channels may be applied with a third electrical signal having a third electric potential that is less than the standard electric potential by a second value at the first point, and the second value may be greater than the first value.

In an embodiment of the present disclosure, electric energy having a first energy value may be stored by a plurality of first capacitors between the first transmittance channels and the display panel, electric energy having a second energy value may be stored by a plurality of second capacitors between the second transmittance channels and the display panel, and electric energy having a third energy value may be stored by a plurality of third capacitors between the some of the third transmittance channels and the display panel. Sum of the first energy and the second energy divided by the third energy may be 0.95 or greater and 1.05 or less.

In an embodiment of the present disclosure, sum of the first energy and the second energy divided by the third energy may be 1.

In an embodiment of the present disclosure, each of the second transmittance channels and the third transmittance channels may be applied with a fourth electrical signal having the first electric potential at a second point that is different from the first point. Each of some of the first transmittance channels adjacent to the second transmittance channels may be applied with a fifth electrical signal having the second electric potential at the second point. Each of the other first transmittance channels may be applied with a sixth electrical signal having a fourth electric potential that is lower than the standard electric potential by a third value at the second point. The third value may be greater than the first value.

In an embodiment of the present disclosure, electric energy having a fourth energy value may be stored by a plurality of fourth capacitors between the some of the first transmittance channels and the display panel. Electric energy having a fifth energy value may be stored by a plurality of fifth capacitors between the other first transmittance channels and the display panel. Electric energy having a sixth energy value may be stored by a plurality of sixth capacitors between the second transmittance channels and the display panel. Electric energy having a seventh energy value may be stored by a plurality of seventh capacitors between the third transmittance channels and the display panel. Sum of the fourth energy, the sixth energy and the seventh energy divided by the fifth energy may be 0.95 or greater and 1.05 or less.

In an embodiment of the present disclosure, sum of the fourth energy, the sixth energy and the seventh energy divided by the fifth energy may be 1.

In an embodiment of the present disclosure, a first receiver channels among the plurality of receiver channels may be applied with a seventh electrical signal having the first electric potential at a third point that is different from the first point and the second point. A second receiver channels adjacent to the first receiver channels among the plurality of receiver channels may be applied with an eighth electrical signal having the second electric potential at the third point. Some of third receiver channels adjacent to the second receiver channels among the plurality of receiver channels may be applied with a nineth electrical signal having a fifth electric potential that is less than the standard electric potential at the third point by a fourth value. The fourth value may be greater than the first value.

In an embodiment of the present disclosure, electric energy having an eighth energy value may be stored by a plurality of eighth capacitors between the first receiver channels and the display panel. Electric energy having a nineth energy value may be stored by a plurality of nineth capacitors between the second receiver channels and the display panel. Electric energy having a tenth energy value may be stored by a plurality of tenth capacitors between the some of the third receiver channels and the display panel. Sum of the eighth energy and the nineth energy divided by the tenth energy may be 0.95 or greater and 1.05 or less.

In an embodiment of the present disclosure, sum of the eighth energy and the nineth energy divided by the tenth energy may be 1.

In an embodiment of the present disclosure, some of the first receiver channels adjacent to the second receiver channels may be applied with a tenth electrical signal having the second electric potential at a fourth point that is different from the third point. The other first receiver channels may be applied with an eleventh electrical signal having a sixth electric potential that is less than the standard electric potential by a fifth value. The second receiver channels and the third receiver channels may be applied with a twelfth electrical signal having the first electric potential at the fourth point. The fifth value may be greater than the first value.

In an embodiment of the present disclosure, electric energy having an eleventh energy value may be stored by a plurality of eleventh capacitors between the some of the first receiver channels and the display panel. Electric energy having a twelfth energy value may be stored by a plurality of twelfth capacitors between the other first receiver channels and the display panel.

Electric energy having a thirteenth energy value may be stored by a plurality of thirteenth capacitors between the second receiver channels and the display panel. Electric energy having a fourteenth energy value may be stored by a plurality of fourteenth capacitors between the third receiver channels and the display panel. Sum of the eleventh energy, the thirteenth energy and the fourteenth energy divided by the twelfth energy may be 0.95 or greater and 1.05 or less.

In an embodiment of the present disclosure, sum of the eleventh energy, the thirteenth energy and the fourteenth energy divided by the twelfth energy may be 1.

The display module according to an embodiment of the present disclosure may include a display panel and an input sensor circuit. The input sensor circuit may be disposed on the display panel and include a plurality of transmittance electrodes and a plurality of receiver-electrodes. Two adjacent transmittance electrodes among the plurality of transmittance electrodes may be electrically connected in the first direction. Two adjacent receiver electrodes among the plurality of receiver electrodes may be electrically connected in the second direction intersecting with the first direction.

Each of first transmittance electrodes among the plurality of transmittance electrodes may be applied with a first electrical signal having a first electric potential that is greater than a standard electric potential at a first point by a first value. Each of second transmittance electrodes among the plurality of transmittance electrodes may be applied with a second electrical signal having a second electric potential that is different from the first electric potential at the first point. Some of third transmittance electrodes among the plurality of transmittance electrodes may be applied with a third electrical signal having a third electric potential that is less than the standard electric potential at the first point by a second value. he second value may be greater than the first value.

In an embodiment of the present disclosure, electric energy having a first energy value may be stored by a plurality of first capacitors between the first transmittance electrodes and the display panel. Electric energy having a second energy value may be stored by a plurality of second capacitors between the second transmittance electrodes and the display panel. Electric energy having a third energy value may be stored by a plurality of third capacitors between the some of the third transmittance electrodes and the display panel. Sum of the first energy and the second energy divided by the third energy may be 0.95 or greater and 1.05 or less.

In an embodiment of the present disclosure, each of the second transmittance electrodes and the third transmittance electrodes may be applied with a fourth electrical signal having the first electric potential at a second point that is different from the first point. Each of some of the first transmittance electrodes adjacent to the second transmittance electrodes may be applied with a fifth electrical signal having the second electric potential at the second point. Each of the other first transmittance electrodes may be applied with a sixth electrical signal having a fourth electric potential that is lower than the standard electric potential by a third value at the second point. The third value may be greater than the first value.

In an embodiment of the present disclosure, electric energy having a fourth energy value may be stored by a plurality of fourth capacitors between the some of the first transmittance electrodes and the display panel. Electric energy having a fifth energy value may be stored by a plurality of fifth capacitors between the other first transmittance electrodes and the display panel. Electric energy having a sixth energy value may be stored by a plurality of sixth capacitors between the second transmittance electrodes and the display panel. Electric energy having a seventh energy value may be stored by a plurality of seventh capacitors between the third transmittance electrodes and the display panel. Sum of the fourth energy, the sixth energy and the seventh energy divided by the fifth energy may be 0.95 or greater and 1.05 or less.

In an embodiment of the present disclosure, a first receiver electrodes among the plurality of receiver electrodes may be applied with a seventh electrical signal having the first electric potential at a third point that is different from the first point and the second point. Second receiver electrodes adjacent to the first receiver electrodes among the plurality of receiver electrodes may be applied with an eighth electrical signal having the second electric potential at the third point.

Some of third receiver electrodes adjacent to the second receiver electrodes among the plurality of receiver electrodes may be applied with a nineth electrical signal having a fifth electric potential that is less than the standard electric potential at the third point by a fourth value. The fourth value may be greater than the first value.

In an embodiment of the present disclosure, electric energy having an eighth energy value may be stored by a plurality of eight capacitors between the first receiver electrodes and the display panel. Electric energy having a nineth energy value may be stored by a plurality of nineth capacitors between the second receiver electrodes and the display panel. Electric energy having a tenth energy value may be stored by a plurality of tenth capacitors between the some of the third receiver electrodes and the display panel. Sum of the eighth energy and the nineth energy divided by the tenth energy may be 0.95 or greater and 1.05 or less.

In an embodiment of the present disclosure, some of the first receiver electrodes adjacent to the second receiver electrodes may be applied with the tenth electrical signal having the second electric potential at a fourth point that is different from the third point. The other first receiver electrodes may be applied with an eleventh electrical signal having a sixth electric potential that is less than the standard electric potential by a fifth value. The second receiver electrodes and the third receiver electrodes may be applied with a twelfth electrical signal having the first electric potential at the fourth point. The fifth value may be greater than the first value.

The electronic device according to an embodiment of the present disclosure may include a display module including a display panel and an input sensor circuit.

The input sensor circuit may include a plurality of transmittance channels arranged on the display panel, extending in a first direction and arranged in a second direction intersecting with the first direction, and a plurality of receiver channels extending in the second direction and arranged in the first direction. Each of first transmittance channels among the plurality of transmittance channels may be applied with a first electrical signal having a first electric potential that is greater than a standard electric potential by a first value. Each of second transmittance channels adjacent to the first transmittance channels among the plurality of transmittance channels may be applied with a second electrical signal having a second electric potential that is different from the first electric potential at the first point. Each of some of the third transmittance channels adjacent to the second transmittance channels among the plurality of transmittance channels may be applied with a third electrical signal having a third electric potential that is less than the standard electric potential by a second value at the first point. The second value may be greater than the first value.

An electronic device according to an embodiment of the present disclosure may include a display module including a display panel and an input sensor circuit.

The input sensor circuit may include a plurality of transmittance channels arranged on the display panel, extending in a first direction and arranged in a second direction intersecting with the first direction, and a plurality of receiver channels extending in the second direction and arranged in the first direction. Each of first transmittance channels among the plurality of transmittance channels may be applied with a first electrical signal having a first electric potential that is greater than a standard electric potential by a first value. Each of second transmittance channels adjacent to the first transmittance channels among the plurality of transmittance channels may be applied with a second electrical signal having a second electric potential that is different from the first electric potential at the first point. Each of some of the third transmittance channels adjacent to the second transmittance channels among the plurality of transmittance channels may be applied with a third electrical signal having a third electric potential that is less than the standard electric potential by a second value at the first point. The second value may be greater than the first value.

According to an embodiment of the present disclosure, it becomes possible to provide a display module, configured to detect a touch of a user and an electronic device including thereof. According to an embodiment of the present disclosure, it becomes possible to provide a display module which accurately detects an area of a user's touch and does not cause a malfunction of another electronic device part by enhancing EMI and an electronic device including thereof.

BRIEF DESCRIPTION OF THE DRAWINGS

These and/or other features will become apparent and more readily appreciated from the following description of the embodiments, taken in conjunction with the accompanying drawings in which:

FIG. 1 illustrates an example of a mobility device according to an embodiment of the present disclosure;

FIG. 9 illustrate the input sensor circuit shown in FIG. 6 viewed from a second point of view according to an embodiment of the present disclosure;

DETAILED DESCRIPTION

Figure 2A:
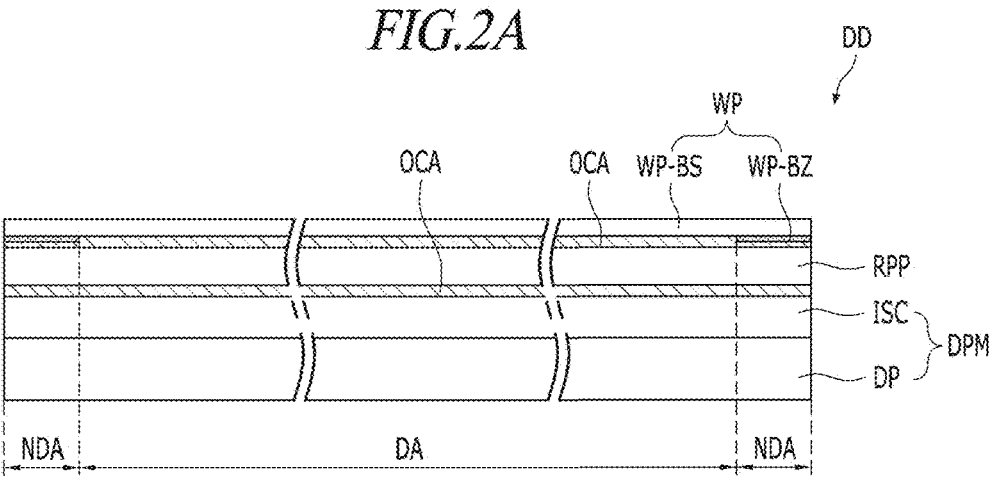
FIGS. 2A to 2D illustrates cross-sectional views of a display device according to an embodiment of the present disclosure.

References will now be made in detail to certain embodiments, of which examples are illustrated in the accompanying drawings, where like reference numerals refer to like elements throughout. The embodiments may have a variety of forms and permutations, but the present disclosure shall by no means be construed as being limited to the described embodiments. Rather, the present disclosure shall be construed to encompass all forms, permutations, equivalents and substitutes covered by the technical ideas and scope of the present disclosure. Accordingly, the embodiments are merely described below, by referring to the figures, to explain features of the present disclosure.

Like or identical reference numerals refer to like or identical elements. Moreover, in the accompanying drawings, the thicknesses, ratios, and dimensions of the elements may not be to exact scale and may have been exaggerated for the benefit of effective explanation of the technical features associated with these elements. As such, the present disclosure shall not be restricted to the thicknesses, ratios, dimensions, etc. illustrated in the drawings.

An expression such as "comprising" or "including" is intended to designate a characteristic, a number, a step, an operation, an element, a part or combinations thereof, and shall not be construed to preclude any possibility of presence or addition of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the present disclosure pertains. Any term that is defined in a general dictionary shall be construed to have the same meaning in the context of the relevant art, and, unless otherwise defined explicitly, shall not be interpreted to have an idealistic or excessively formalistic meaning.

A display device may include an input sensor circuit disposed on a display panel. The input sensor circuit includes transmission channels and receiver channels that operate to detect a touch input, for example, a touch from the finger of a user. When the transmission and receiver channels are driven by signals of a same phase and polarity, capacitors formed by the transmission and receiver channels store all positive (or negative) energy, which gives off a corresponding electric field. As a result, the input sensor circuit emits substantial levels of electromagnetic interference (EMI) that impairs operation of circuits in the vicinity of the input sensor circuit. This is especially the case when the input sensor circuit is used in a mobility device such as a car.

According to one or more embodiments, an input sensor circuit is partitioned into a plurality of channels arranged in different areas. The different areas include a driving area and a non-driving area. The driving area includes a plurality of channels, and the non-driving area includes a guard area and a reverse driving area, each including additional channels. The channels include transmission channels and receiver channels that form capacitors of the input sensor circuit.

In operation, an input sensor driving unit drives the channels in the input sensor circuit using different waveforms. The channels in the driving area are driven by a first waveform to store first energy in corresponding capacitors. The channels in the guard area are driven by a second waveform to store second energy in corresponding capacitors. The channels in the reverse driving area are driven by a third waveform to store third energy in corresponding capacitors. The waveforms may have, for example, different peak voltages and different polarities, with different energies stored in the capacitors.

In one embodiment, the input sensor driving unit drives the channels in the reverse driving area out-of-phase with the channels in the driving area, so that the third (negative) energy at least partially offsets a sum of the first and second (positive) energies. This results in a reduction in electromagnetic interference emitted by the input sensor circuit, which, for example, prevents operation of the input sensor circuit from adversely affecting other circuits in the vicinity of the input sensor circuit, e.g., other circuits in a vehicle or other mobility device.

Figure 1:
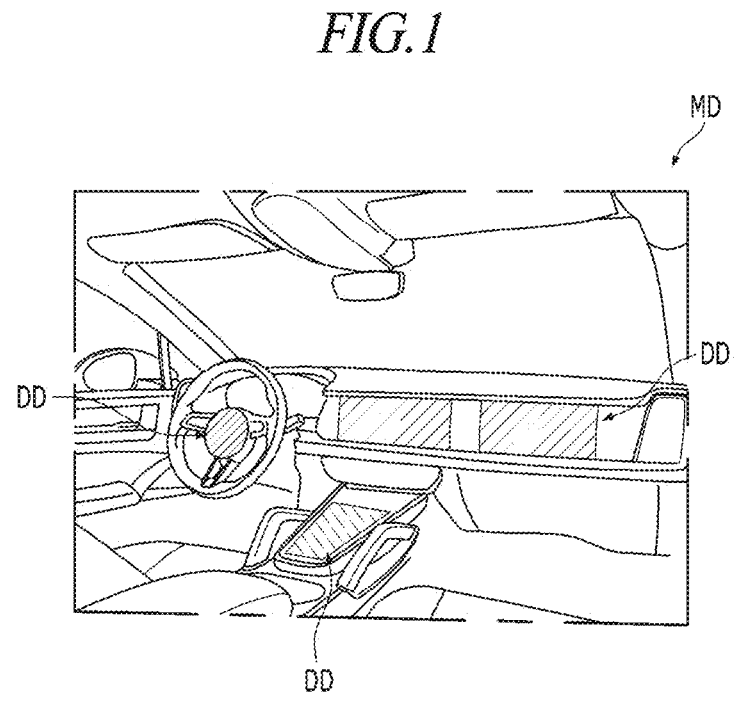

FIG. 1 is an exemplary illustration of a mobility device MD according to an embodiment of the present disclosure. In this example, the mobility device MD is a car. However, the embodiments described herein are not limited to a car, but rather may apply to other types of mobility devices (e.g., vehicles) such as, for example, electric trains, micro mobility vehicles, a bicycle, or a plane. In FIG. 1, examples are shown of display devices DD arranged throughout predetermined locations in the car. For example, a display device DD may be integrated into a steering wheel of the car. A display device DD may also be integrated into a center console of a car. And, a display device DD may be integrated into the dashboard of the car. A display device DD in accordance with the embodiments described herein may be located in other areas of a vehicle in other embodiments.

FIGS. 2A, 2B, 2C and 2D are cross-sectional views of the display device DD according to an embodiment of the present disclosure. FIGS. 2A through 2D are simplified to describe laminated relations among functional panels and/or functional members of the display device DD.

As illustrated in FIG. 2A, the display device DD may include a display panel DP, an input sensor circuit ISC, a reflection protection member RPP and a window member (or window plate) WP. The input sensor circuit ISC may be directly disposed on the display panel DP. When an element is "directly disposed on" another element, it shall be construed that there is no other adhesive layer/adhesive member interposed therebetween. In other embodiments, the input sensor circuit ISC may be indirectly disposed on the display panel DP, e.g., may include one or more intervening layers.

In one embodiment, a display module DPM may include the display panel DP and the input sensor circuit ISC disposed on the display panel DP. An optically clear adhesive member (or layer) OCA may be disposed between the display module DPM and the reflection protection member RPP and also between the reflection protection member RPP and the window member WP.

The display panel DP outputs a moving or still image, and the input sensor circuit ISC obtains a coordination information of an external input (e.g., microcurrent or applied pressure). The display module DPM according to an embodiment of the present disclosure may further include a protective plate disposed below the display panel DP. The protective plate and the display panel DP may be coupled by an adhesive member. (The display devices DD of FIGS. 2B through 2D described hereinafter may also further include a protective member or plate.)

The display panel DP according to an embodiment of the present disclosure may be a light-emitting display panel. For example, a display panel DP may be an organic light-emitting display panel, a quantum dot light-emitting display panel, or a micro light-emitting display panel. A light-emitting layer of an organic light-emitting display panel may include an organic light-emitting material. An inorganic light-emitting display panel composed of an inorganic material may include a quantum dot light-emitting display panel or a micro light-emitting display panel. Hereinafter, the display panel DP is described as an organic light-emitting display panel.

The reflection protection plate RPP reduces a reflection rate of an external light incident from an upper side of the window plate WP. The reflection protection plate RPP according to an embodiment of the present disclosure may include one or more of a retarder and a polarizer. The reflection protection plate RPP according to an embodiment of the present disclosure may include color-filters.

The window plate WP according to an embodiment of the present disclosure includes a base film WP-BS and a light-blocking pattern WP-BZ. The base film WP-BS may include glass and/or a synthetic resin. The base film WP-BS is not limited to a single layer. The base film WP-BS may include two or more films coupled by an adhesive member.

The light-blocking pattern WP-BZ partially overlaps with edges of the base film WP-BS. The light-blocking pattern WP-BZ may be disposed below the base film WP-BS to form a bezel area (e.g., non-display area NTDA) of the display device DD. Hereinafter, the light blocking pattern WP-BZ and the base film WP-BS are not illustrated in FIGS. 2B through 2D.

Figure 2B:
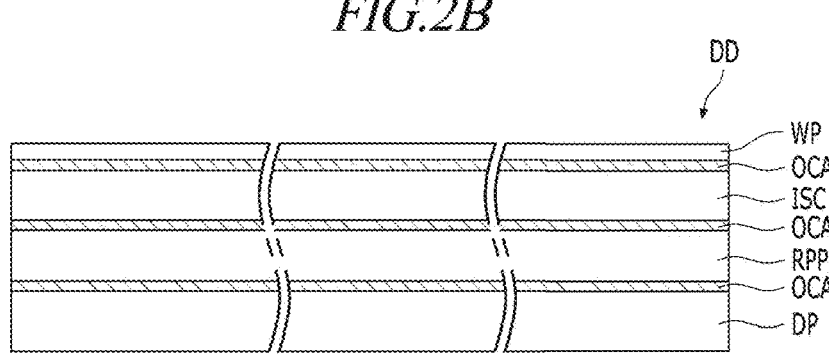

As illustrated in FIG. 2B, another embodiment of the display device DD may include a display panel DP, a reflection protection plate RPP, an input sensor circuit ISC, and a window plate WP. In this embodiment, the reflection protection plate RPP is disposed between the input sensor circuit ISC and the display panel DP. The display panel DP and the reflection protection plate RPP may be coupled by an optically clear adhesive member OCA. The reflection protection plate RPP and the input sensor circuit ISC may be coupled by an optically clear adhesive member OCA. The input sensor circuit ISC and the window plate WP may be coupled by an optically clear adhesive member OCA.

Figure 2C:
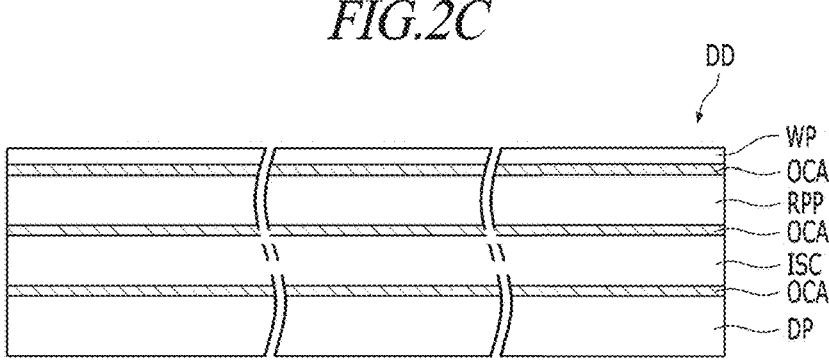

Referring to FIG. 2C, another embodiment of the display device DD may include a display panel DP, an input sensor circuit ISC, a reflection protection plate RPP, and a window plate WP. These features may be similar to the ones described above, but a difference from FIG. 2B is that positions of the reflection protection plate RPP and the input sensor circuit ISC are switched.

Figure 2D:
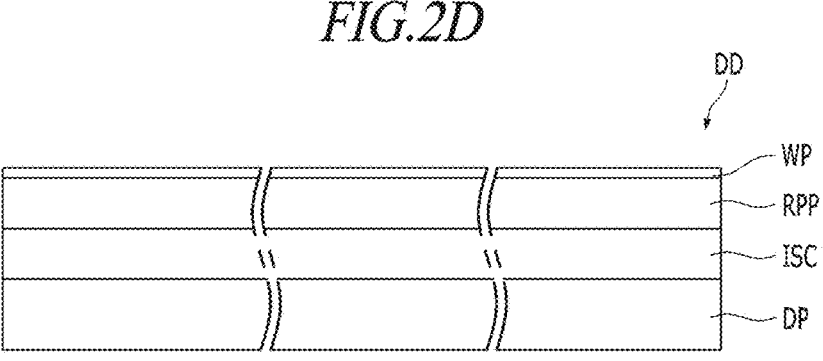

As illustrated in FIG. 2D, another embodiment of the display device DD may include a display panel DP, an input sensor circuit ISC, a reflection protection plate RPP, and a window plate WP. However, unlike other embodiments, adhesive members may be omitted from the display device DD, and the display panel DP, the input sensor circuit ISC, the reflection protection plate RPP, and the window plate WP may be sequentially laminated. In another embodiment of the present disclosure, the lamination order of the input sensor circuit ISC and the reflection protection plate RPP may be different or switched.

Figure 3:
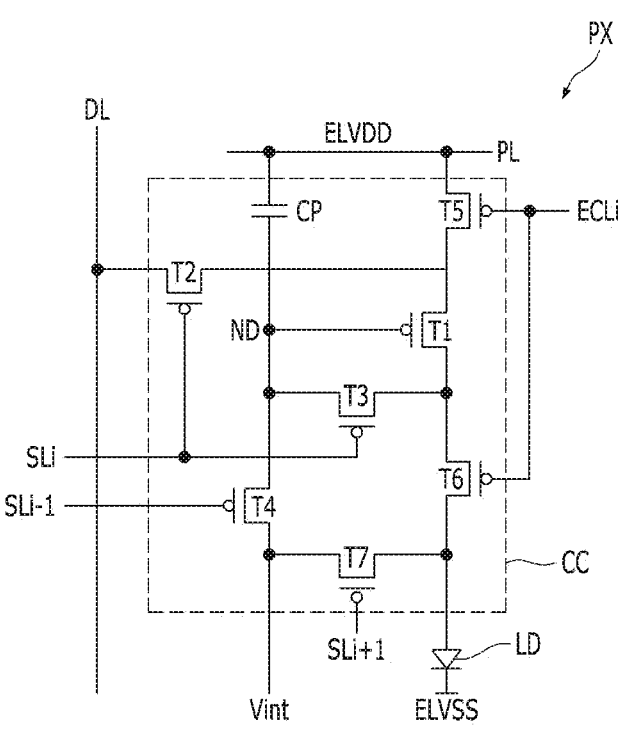
FIG. 3 illustrates an equivalent circuit of a pixel according to an embodiment of the present disclosure.
Figure 4:
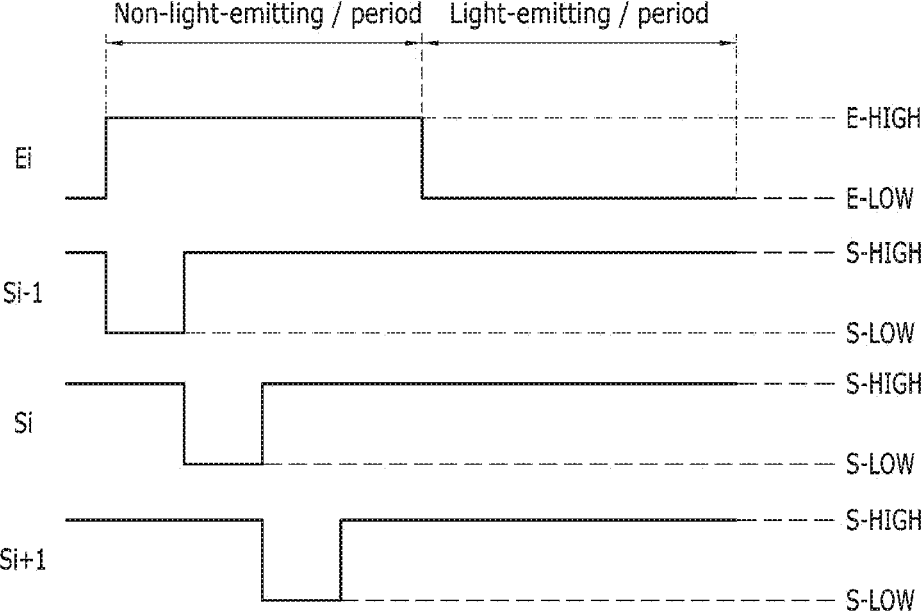
FIG. 4 illustrates an example of signals applied to the pixel shown in FIG. 3 according to an embodiment of the present disclosure.

FIG. 3 illustrates an equivalent circuit of a pixel PX which may be representative of pixels in the display device DD according to an embodiment of the present disclosure. FIG. 4 is an exemplary illustration of a light-emitting control signal Ei and scan signals Si−1, Si and Si+1 applied to the pixel PX of FIG. 3. FIG. 4 is an exemplary illustration of the pixel PX connected to an i-th scan line SLi and an i-th light-emitting control line ECLi.

The pixel PX may include a light-emitting diode LD and a pixel circuit CC. An organic light-emitting diode OLED is one example of a light-emitting diode LD, but the present disclosure is not limited thereto. The pixel circuit CC may include a plurality of transistors T1 to T7 and a capacitor CP. The pixel circuit CC controls the amount of current flowing through the light-emitting diode LD in response to a data signal.

The light-emitting diode LD may emit light with a predetermined luminance corresponding to the amount of current provided from the pixel circuit CC. To that end, a level of a first power ELVDD may be set higher than a level of a second power ELVSS.

In the pixel circuit CC, each of the plurality of transistors T1 to T7 may include an input electrode (or a source electrode), an output electrode (or a drain electrode), and a control electrode (or a gate electrode). In the present disclosure, for convenience, one of the input electrode and the output electrode may be referred to as a first electrode, and the other may be referred to as a second electrode.

The first electrode of the first transistor T1 is connected to the first power ELVDD via the fifth transistor (or first emission transistor) T5, and the second electrode is connected to the anode electrode of the light-emitting diode LD via the sixth transistor (or second emission transistor) T6. The first transistor T1 may further include a control (or gate)

electrode coupled to a node ND, and may be referred to as a driving transistor in this specification. The first transistor T1 is configured to control the amount of current flowing through the light-emitting diode LD in response to a voltage applied to the control electrode.

The second transistor (or switching transistor) T2 is connected between the data line DL and the first electrode of the first transistor T1. In addition, the control electrode of the second transistor T2 is connected to the i-th scan line SLi. When the i-th scan signal Si is provided to the i-th scan line SLi, the second transistor T2 is turned on to electrically connect the data line DL and the first electrode of the first transistor T1.

The third transistor T3 is connected between the second electrode and the control electrode of the first transistor T1. The control electrode of the third transistor T3 is connected to the i-th scan line SLi. When the i-th scan signal Si is provided to the i-th scan line SLi, the third transistor T3 is turned on to electrically connect the second electrode and the control electrode of the first transistor T1. Accordingly, when the third transistor T3 is turned on, the first transistor T1 is connected in the form of a diode.

The fourth transistor T4 is connected between the node ND and an initialization power generation unit, e.g., a power supply circuit or power source. In addition, the control electrode of the fourth transistor T4 is connected to the (i−1)-th scan line SLi−1. When the (i−1)-th scan signal Si−1 is provided to the (i−1)-th scan line SLi−1, the fourth transistor T4 is turned on to provide an initialization voltage Vint to the node ND.

The fifth transistor T5 is connected between a power line PL and the first electrode of the first transistor T1. The control electrode of the fifth transistor T5 is connected to the i-th light-emission control line ECLi.

The sixth transistor T6 is connected between the second electrode of the first transistor T1 and the anode electrode of the light-emitting diode LD. In addition, the control electrode of the sixth transistor T6 is connected to the i-th light-emission control line ECLi.

The seventh transistor T7 is connected between the initialization power generation unit and the anode electrode of the light-emitting diode LD. In addition, the control electrode of the seventh transistor T7 is connected to the (i+1)-th scan line SLi+1. When the (i+1)-th scan signal Si+1 is provided to the (i+1)-th scan line SLi+1, such seventh transistor T7 is turned on to provide the initialization voltage Vint to the anode electrode of the light-emitting diode LD. In FIG. 3, the same initialization voltage Vint is used to initialize both node ND and the light-emitting diode. In other embodiments, different initialization voltages may be used.

The seventh transistor T7 may improve the black expression capability of the pixel PX. For example, when the seventh transistor T7 is turned on, a parasitic capacitor of the light-emitting diode LD is discharged. Then, when the black luminance is implemented, the light-emitting diode LD does not emit light due to the leakage current from the first transistor T1. In this way, the black expression capability of the pixel may be improved.

In FIG. 3, the control electrode of the seventh transistor T7 is shown to be connected to the (i+1)-th scan line SLi+1, but the present disclosure is not limited to this configuration. In another embodiment of the present disclosure, the control electrode of the seventh transistor T7 may be connected to the i-th scan line SLi or the (i−1)-th scan line SLi−1. Moreover, FIG. 3 shows the transistors T1 to T7 as PMOS transistors, but the present disclosure is not limited to this configuration. In another embodiment of the present disclosure, all or a portion of the transistors T1 to T7 of the pixel PX may be NMOS transistors. In another embodiment of the present disclosure, the pixel PX may be composed of a combination of NMOS and PMOS transistors.

The capacitor CP is interposed between the power line PL and the node ND. The capacitor CP is configured to store a voltage corresponding to the data signal. When the fifth transistor T5 and the sixth transistor T6 are turned on, the amount of current flowing through the first transistor T1 may be determined according to the voltage stored in the capacitor CP.

Referring to FIG. 4, the light emission control signal Ei may have a high level E-HIGH or a low level E-LOW. Each of the scan signals SLi−1, SLi, and SLi+1 may have a high level S-HIGH or a low level S-LOW. The high level E-HIGH and S-HIGH may correspond to a turn-off voltage, the low level E-LOW and S-LOW may correspond to a turn-on voltage.

For example, when the light emission control signal Ei has a high level E-HIGH, the fifth transistor T5 and the sixth transistor T6 are turned off. When the fifth transistor T5 is turned off, the power line PL and the first electrode of the first transistor T1 are electrically cut off. When the sixth transistor T6 is turned off, the second electrode of the first transistor T1 and the anode electrode of the light-emitting diode LD are electrically cut off. Accordingly, the light-emitting diode LD does not emit light while the light emission control signal Ei having a high level E-HIGH is provided to the i-th light emission control line ECLi.

Thereafter, when the (i−1)-th scan signal Si−1 provided to the (i−1)-th scan line SLi−1 has a low level S-LOW, the fourth transistor T4 is turned on. When the fourth transistor T4 is turned on, the initialization voltage Vint is provided to the node ND.

When the i-th scan signal Si provided to the i-th scan line SLi has a low level S-LOW, the second transistor T2 and the third transistor T3 are turned on. When the second transistor T2 is turned on, a data signal is provided from the data line DL to the first electrode of the first transistor T1. Here, since the node ND is initialized to the initialization voltage Vint, the first transistor T1 is turned on. When the first transistor T1 is turned on, a voltage corresponding to the data signal is provided to the node ND. Here, the capacitor CP stores a voltage corresponding to the data signal.

When the (i+1)-th scan signal Si+1 provided to the (i+1)-th scan line SLi+1 has a low level S-LOW, the seventh transistor T7 is turned on. When the seventh transistor T7 is turned on, the initialization voltage Vint is provided to the anode electrode of the light-emitting diode LD, thereby discharging the parasitic capacitor of the light-emitting diode LD.

When the light emission control signal Ei provided to the light emission control line ECLi has a low level E-LOW, the fifth transistor T5 and the sixth transistor T6 are turned on. When the fifth transistor T5 is turned on, the first power ELVDD is provided to the first electrode of the first transistor T1. When the sixth transistor T6 is turned on, the second electrode of the first transistor T1 and the anode electrode of the light-emitting diode LD are electrically connected. Then, the light-emitting diode LD generates light of a predetermined luminance in response to the amount of supplied current, which is proportional to the voltage stored in the capacitor CP.

Figure 5:
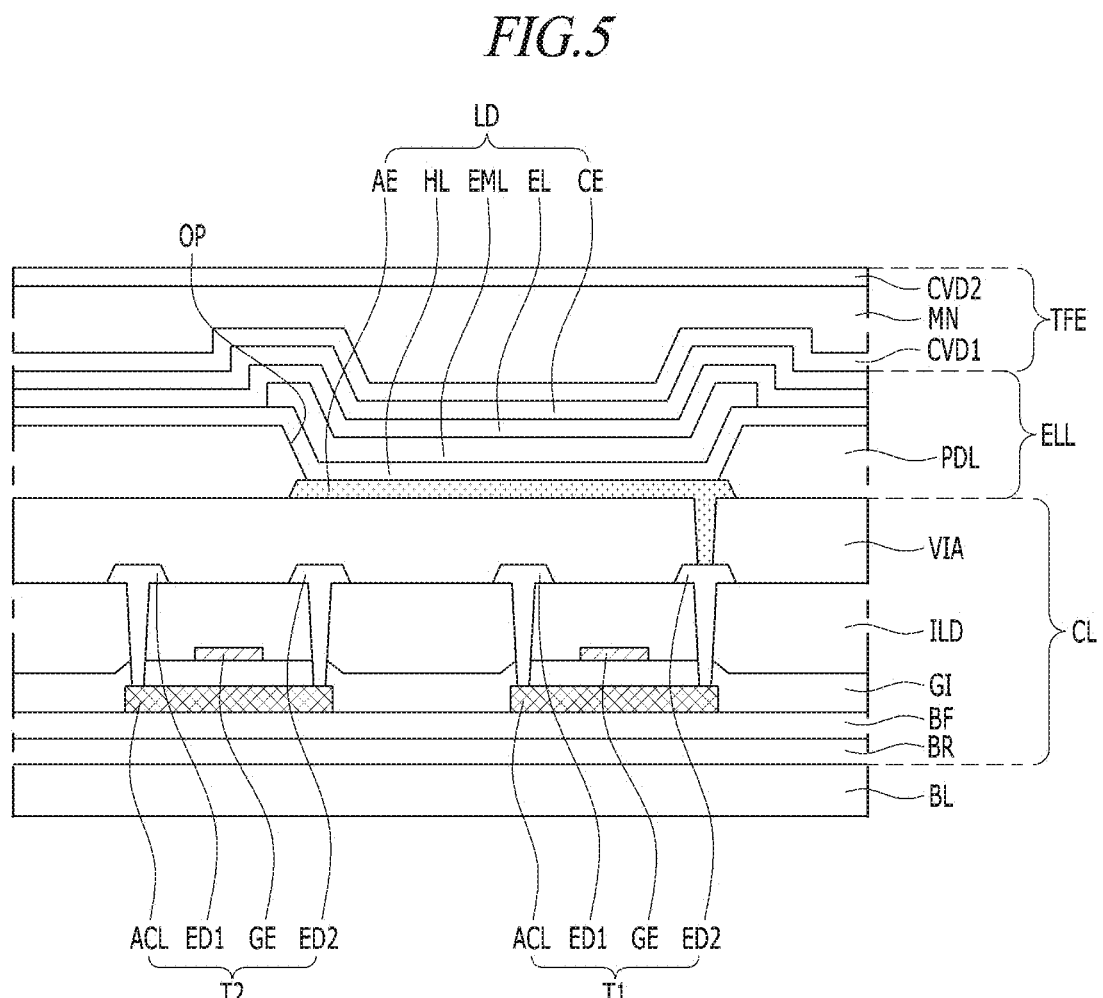
FIG. 5 illustrates a partial cross-section of a display panel according to an embodiment of the present disclosure.

FIG. 5 is an exemplary illustration of a partial cross-section of the display panel DP described with reference to FIGS. 2A to 2D according to an embodiment of the present disclosure. An example of the first transistor T1 and the second transistor T2 is illustrated in FIG. 5, but the structures of the first transistor T1 and the second transistor T2 are not limited to what is illustrated in FIG. 5.

In FIG. 3, the second electrode ED2 of the first transistor T1 is illustrated to make direct contact with the anode electrode AE of the pixel PX, but this merely is a cross-sectional shape and is thus shown. In fact, as shown in FIG. 4, the first transistor T1 may be connected to the anode electrode AE of the pixel PX through the sixth transistor T6. However, the present disclosure is not limited to this configuration, and in an embodiment of the present disclosure, the second electrode ED2 of the first transistor T1 may make direct contact with the anode electrode AE of the pixel PX.

The display panel DP may include a circuit layer CL, a light-emitting layer ELL, and an encapsulation layer TFE. The circuit layer CL may include a barrier layer BR, a buffer layer BF, one or more gate insulating layers GI, an interlayer insulating layer ILD, a circuit insulating layer VIA, and transistors T1 and T2.

The light-emitting layer ELL may be disposed on the circuit layer CL. The light-emitting layer ELL may include a light-emitting diode LD and a pixel defining film PDL.

The encapsulation layer TFE may be configured to seal off the light-emitting layer ELL to protect the light-emitting layer ELL from external oxygen or moisture. The encapsulation layer TFE may include a first inorganic layer CVD1, an organic layer MN, and a second inorganic layer CVD2. In FIG. 5, the encapsulation layer TFE is illustrated, as an example, to include two inorganic layers and one organic layer, but the present disclosure is not limited to this example. For example, the encapsulation layer TFE may include three inorganic layers and two organic layers. In this case, the inorganic layers and the organic layers may be alternately laminated. Functional layers BR and BF may be disposed on one side of a base layer BL. The functional layer BR and BF may include a barrier layer BR and a buffer layer BF.

The functional layers BR and BF are configured to prevent impurities existing in the bottom layer from flowing into the pixel PX during the manufacturing process. In particular, diffusion of impurities into active areas ACL of the transistors T1 and T2 in the pixel PX is prevented.

The active areas ACL in the transistors T1 and T2 are disposed on the buffer layer BF. Each of the active areas ACL may include polysilicon or amorphous silicon. Other active areas ACL may include a metal oxide semiconductor. Each of the active areas ACL may include a channel area serving as a passage through which electrons or holes may move, and a first ion-doped area and a second ion-doped area disposed with the channel area therebetween. The first ion-doped area may be one of a source or drain and the second ion-doped area may be the other one of the source or drain.

The gate insulting layer GI covers the active areas ACL and is disposed on the buffer layer BF. The gate insulating layer GI includes an organic and/or an inorganic film. The gate insulating layer GI may include a plurality of inorganic thin films. The plurality of inorganic thin films may include a silicon nitride layer and a silicon oxide layer.

Control (gate) electrodes GE composing each of the transistors T1 and T2 are disposed on the gate insulating layer GI. At least a portion of the scan lines SL (e.g., see FIG. 4) and the light emission control lines ECL (e.g., see FIG. 4) may be disposed on the gate insulating layer GI.

An interlayer insulating layer ILD covering the control electrodes GE of the transistors T1 and T2 is disposed on the gate insulating layer GI. The interlayer insulating layer ILD includes an organic and/or an inorganic layer. The interlayer insulating layer ILD may include a plurality of inorganic thin films or organic thin films. The plurality of inorganic thin films may include a silicon nitride layer and a silicon oxide layer.

At least a portion of the data line DL (see FIG. 4) and the power line PL (see FIG. 4) may be disposed on the interlayer insulating layer ILD. The first electrodes ED1 and the second electrodes ED2 of each of the transistors T1 and T2 may be disposed on the interlayer insulating layer ILD. The first electrodes ED1 and the second electrodes ED2 may be connected to corresponding ones of the active areas ACL through contact holes penetrating the gate insulating layer GI and the interlayer insulating layer ILD, respectively.

A circuit insulating layer VIA covering the first electrodes ED1 and the second electrodes ED2 is disposed on the interlayer insulating layer ILD. The circuit insulating layer VIA includes an organic layer and/or an inorganic layer. The circuit insulating layer VIA may provide a flat (or planarized) surface. The circuit insulating layer VIA may be interposed between the anode electrode AE of the light-emitting diode LD and the transistors T1 and T2. A pixel defining film PDL and the light-emitting diode LD are disposed on the circuit insulating layer VIA.

The light-emitting diode LD may include an anode electrode AE, a hole control layer HL, a light-emitting layer EML, an electron control layer EL, and a cathode electrode CE. The anode electrode AE may be connected to the second electrode ED2 through contact holes penetrating the circuit insulating layer VIA. An opening part OP defined in the pixel defining film PDL may be configured to expose the anode electrode AE.

Figure 6:
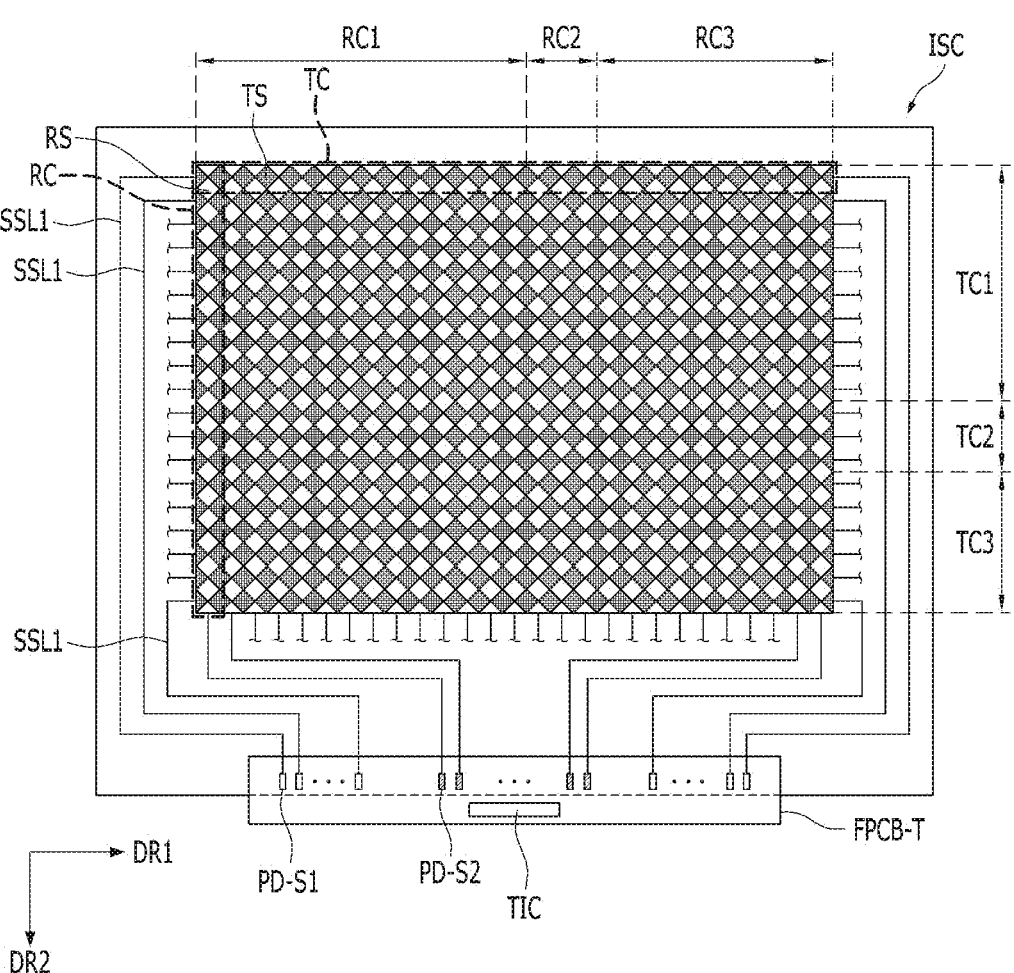
FIG. 6 illustrates an input sensor circuit according to an embodiment of the present disclosure.

FIG. 6 is an exemplary plan view of the input sensor circuit ISC according to an embodiment of the present disclosure.

Referring to FIG. 6, the input sensor circuit (or touch panel) ISC may include a plurality of transmittance channels TC, a plurality of receiver channels RC, signal pads PD-S1 and PD-S2, a printed circuit board FPCB-T, and an input sensor driving unit TIC. The input sensor circuit ISC may be configured to detect an applied external input. The applied external input may be provided in various forms. As an example, the external input may be applied based on the shape of a part (e.g., finger) of a user's body, a stylus pen, a pressure or hovering.

In an embodiment of the present disclosure, each of the plurality of transmittance channels TC may extend in a first direction DR1. The plurality of transmittance channels TC may be arranged in a second direction DR2 intersecting with the first direction DR1. Each of the plurality of transmittance channels TC may include a plurality of transmittance electrodes TS. For example, the plurality of transmittance electrodes TS may be a Tx sensor.

In an embodiment of the present disclosure, each of the plurality of receiver channels RC may extend in the second direction DR2. The plurality of receiver channels RC may be arranged in the first direction DR1. Each of the plurality of receiver channels RC may include a plurality of receiver electrodes RS. For example, the plurality of receiver electrodes RS may be a Rx sensor.

In the present disclosure, the transmittance electrodes TS and the receiver electrodes RS of the input sensor circuit ISC may be arranged in a shape of matrix intersecting each other. However, the present disclosure is not limited thereto, and the transmittance electrodes TS and the receiver electrodes RS may be arranged, for example, in an intersecting shape of a geometric configuration.

In an embodiment of the present disclosure, each of the transmittance electrodes TS and the receiver electrodes RS may be formed on different layers or a same layer on a substrate and may include a transparent conductive material. For example, the transmittance electrodes TS and the receiver electrodes RS may include indium tin oxide, indium zinc oxide, indium gallium zinc oxide or zinc oxide (ZnO). However, the present disclosure is not limited to the examples, and each of the transmittance electrodes TS and the receiver electrodes RS may include molybdenum (Mo).

In an embodiment of the present disclosure, the transmittance electrodes TS and the receiver electrodes RS are illustrated to have a rhombus shape, but the present disclosure is not limited to what is illustrated in the figure. The transmittance electrodes TS and the receiver electrodes RS may have a different polygonal shape, or a bar or mesh pattern.

According to an embodiment of the present disclosure, the printed circuit board FPCB-T may be electrically connected to the signal pads PD-S1 and PD-S2. First signal pads PD-S1 may be connected to first signal lines SSL1 and configured to apply a signal to each of the transmittance electrodes TS. In addition, the first signal pads PD-S1 may be connected to the first signal lines SSL1 and configured to receive a signal from the receiver electrodes TS. Second signal pads PD-S2 may be connected to second signal lines SSL2 and configured to apply a signal to the receiver electrodes RS. In addition, the second signal pads PD-S2 may be connected to the second signal lines SSL2 and configured to receive a signal from the receiver electrodes RS.

The input sensor driving unit TIC may be mounted on the printed circuit board FPCB-T. However, the present disclosure is not limited thereto, and the input sensor driving unit TIC may be mounted on a different portion of the input sensor circuit ISC or a different portion of the display module DPM. The input sensor driving unit TIC may be configured to transmit/receive or process electric signals for determining whether a user's touch (or other form of external touch input) has occurred in the input sensor area SA.

In an embodiment of the present disclosure, the capacitors formed between the plurality of transmittance channels TC and the display panel DP may be referred to as transmittance base capacitors TCB. Particularly, the transmittance base capacitors TCB may be capacitors formed between the plurality of transmittance channels and the cathode electrode CE.

In an embodiment of the present disclosure, the capacitors between the plurality of receiver channels RC and the display panel DP may be referred to as receiver base capacitors RCB. Particularly, the receiver base capacitors RCB may be capacitors formed between the plurality of receiver channels RC and the cathode electrode CE.

In an embodiment of the present disclosure, the capacitors formed between the plurality of transmittance channels TC and the plurality of receiver channels RC may be referred to as mutual capacitors MCB.

The input sensor circuit ISC may operate in a capacitive method or a resistive film method according to its operation principle. The capacitive method may be used for the input sensor circuit ISC according to an embodiment of the present disclosure. For example, as soon as an electrically conductive conductor makes contact with the input sensor circuit ISC, a capacitance of the corresponding portion changes. This change in capacitance is detected, and thus it becomes possible to detect whether a touch input has occurred through such change in capacitance.

The input sensor circuit ISC may be configured to detect a touch input by implementing a self-capacitance operation method of using transmittance base capacitors TCB and receiver base capacitors RCB and a mutual-capacitance operation method of using mutual capacitors MCB. A self-capacitance operation method of transmittance electrodes TS, a self-capacitance operation method of receiver electrodes RS and a mutual-capacitance operation method between transmittance electrodes TS and receiver electrodes RS may be successively implemented. For example, the self-capacitance operation method of transmittance electrodes TS may detect a touch input by using a capacitor formed between the transmittance electrodes TS and the cathode electrode CE. The self-capacitance operation method of receiver electrodes RS may detect a touch input by using a capacitor formed between the receiver electrodes RS and the cathode electrode CE. The mutual-capacitance operation method between the transmittance electrodes TS and the receiver electrodes RS may detect a touch input by using a capacitor formed between the transmittance electrodes TS and the receiver electrodes RS.

According to an embodiment of the present disclosure, the self-capacitance operation method of the transmittance electrodes TS is explained by dividing it into a first point t1 and a second point t2. The self-capacitance operation method of the receiver electrodes RS is explained by dividing it into a third point t3 and a fourth point t4. Each point t1, t2, t3 and t4 is randomly set and may be changed in various ways.

The plurality of transmittance channels TC may include first transmittance channels TC1, second transmittance channels TC2 and third transmittance channels TC3. In the present disclosure, the first transmittance channels TC1 may be defined with a first sub transmittance channel through a tenth sub transmittance channel. The second transmittance channels TC2 may be defined with an eleventh sub transmittance channel through a thirteenth sub transmittance channel. The third transmittance channels TC3 may be defined with a fourteenth sub transmittance channel through a nineteenth sub transmittance channel. The first through the nineteenth sub transmittance channels may be arranged in order along the second direction DR2. The first sub transmittance channel is a transmittance channel disposed at an uppermost location in the second direction DR2 among the transmittance channels TC. The nineteenth transmittance channel is disposed at a lowermost location in the second direction DR2 among the transmittance channels TC. However, the present disclosure is not limited thereto, and the number of transmittance and/or sub transmittance channels and an area of the plurality of transmittance channels TC included by the plurality of transmittance channels TC may be different among different embodiments.

The plurality of receiver channels RC may include first receiver channels RC1, second receiver channels RC2 and third receiver channels RC3. In the present disclosure, the first receiver channels RC1 may be defined with a first sub receiver channel through a fourteenth sub receiver channel. The second receiver channels RC2 may be defined with a fifteenth sub receiver channel through a seventh sub receiver channel. The third receiver channels RC3 may be defined with an eighteenth sub receiver channel through a twenty seventh sub receiver channel. The first through the twenty seventh sub receiver channels may be arranged in order along the first direction DR1. The first sub receiver channel is disposed at the leftmost location in the first direction DR1 among the receiver channels RC. The twenty seventh sub receiver channel is disposed at the rightmost location in the first direction DR1 among the receiver channels RC. However, the present disclosure is not limited thereto, and the number of receiver and/or sub receiver channels and an area included by the plurality of receiver channels RC may be different among different embodiments.

Figure 7:
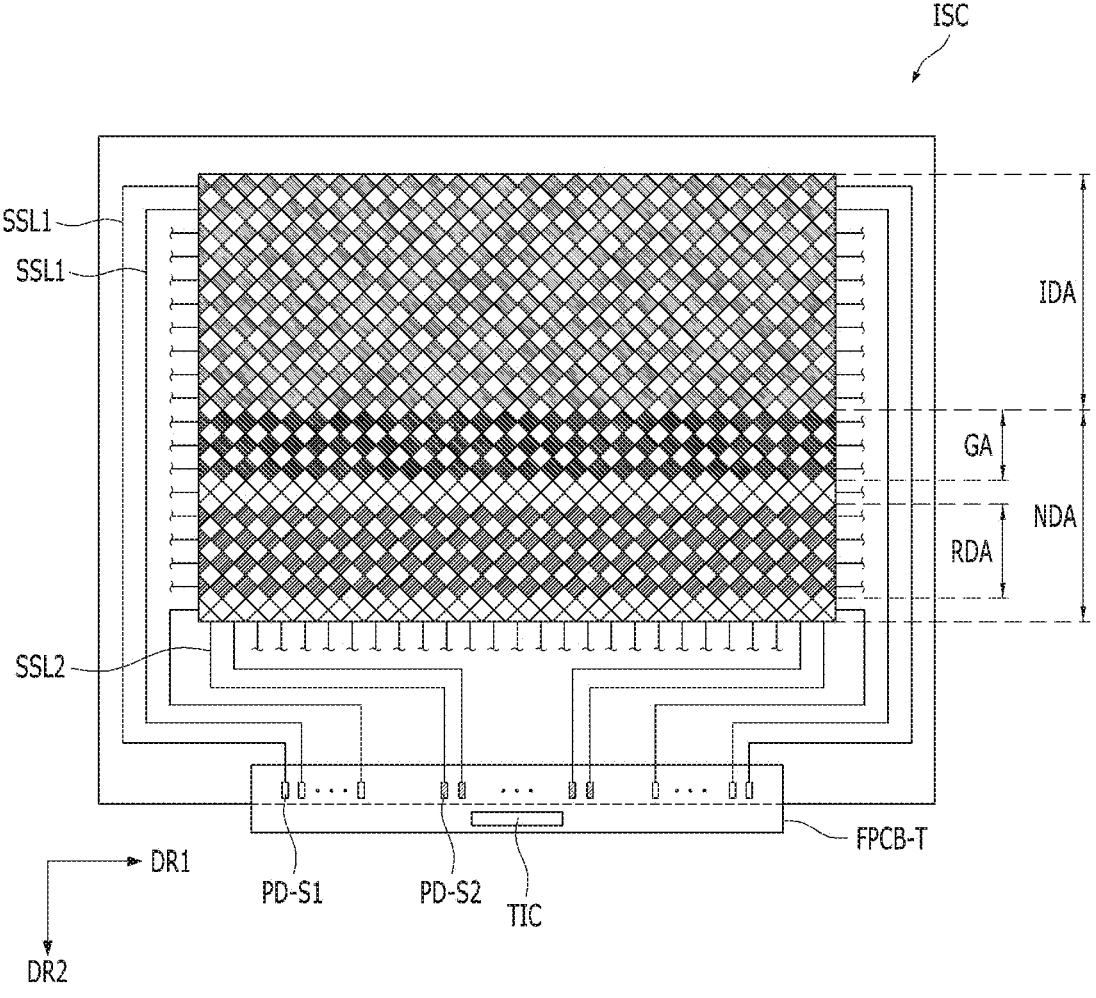
FIG. 7 illustrates the input sensor circuit shown in FIG. 6 viewed from a first point of view according to an embodiment of the present disclosure.

FIG. 7 is an exemplary illustration of the input sensor circuit ISC shown in FIG. 6 at the first point t1. As shown in FIG. 7, the input sensor circuit ISC is shown to include a driving area IDA and a non-driving area NDA at the first point t1. The driving area IDA may be adjacent to the non-driving area NDA. The driving area IDA may be an area applied with a pre-determined voltage and actually driven to detect a touch input. The non-driving area NDA may be an area other than the driving area IDA, e.g., a remaining portion of the input sensor circuit ISC. The non-driving area NDA may include a guard area GA and a reverse driving area RDA. The guard area GA may be an area applied with a predetermined voltage and configured to remove a parasite capacitance. The reverse driving area RDA may be an area applied with a voltage that is out of phase (antiphase, e.g., offset in phase by 180°) relative to the voltage applied to the driving area IDA. In one embodiment, the reverse driving area RDA may be larger than (may include more channels than) the guard area GA.

At the first point t1, the first sub transmittance channel through the tenth sub transmittance channel (e.g., the ten sub transmittance channels starting from the top in the second direction corresponding to transmittance channels TC1) may be configured to operate in the driving area IDA. At the first point t1, the eleventh sub transmittance channel through the thirteenth transmittance channel (e.g., the eleventh through the thirteenth transmittance channels from the top in the second direction) may be configured to operate in the guard area GA. At the first point t1, the fifteenth sub transmittance channel through the eighteenth sub transmittance channel (e.g., the fifteenth through the eighteenth transmittance channels from the top in the second direction) may be configured to operate in the reverse driving area RDA.

Figure 8A:
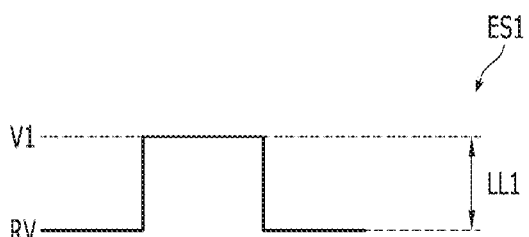
FIGS. 8A to 8C illustrate a signal applied to the input sensor circuit shown in FIG. 7 according to an embodiment of the present disclosure.
Figure 8B:
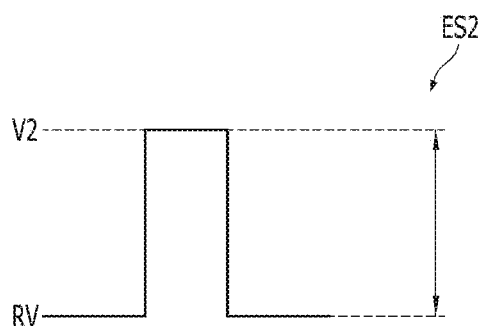
Figure 8C:
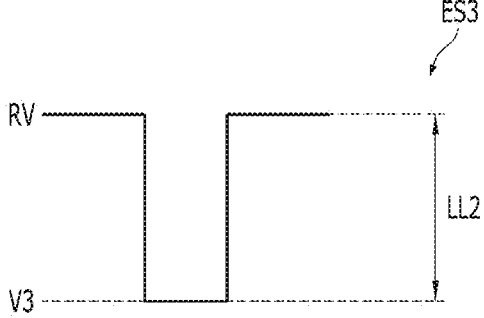

FIG. 8A to FIG. 8C illustrate examples of a signal applied to the transmittance channels in each area of the input sensor circuit ISC shown in FIG. 7, e.g., FIG. 8A, FIG. 8B and FIG. 8C show examples of electrical signals ES1, ES2, and ES3 applied to the transmittance electrodes TS in respective ones of the areas shown in FIG. 7 at the first point t1.

In an embodiment of the present disclosure, a minimum number of bursts of the electrical signal ES applied to the transmittance channels TC is illustrated. However, the present disclosure is not limited to what is illustrated in the figure, and the number of bursts of the electrical signal ES applied to the transmittance channels TC may be increased.

In the present disclosure, the electrical signal ES applied to the transmittance channels TC have predetermined waveforms, each being exemplarily illustrated in FIGS. 8A to 8C as a square wave. However, the present disclosure is not limited to the waveforms illustrated in FIGS. 8A to 8C. For example, the signals applied to the transmittance channels TC may be a sinusoidal wave, a triangular wave, a pulse wave or a sawtooth wave.

Referring to FIG. 8A, a first electrical signal ES1 having a first electric potential V1, that is greater than a standard electric potential RV by a first value LL1, may be applied to the first transmittance channels TC1 of the driving area IDA at the first point t1. For example, the difference between the first electric potential V1 and the standard electric potential RV may be 0.5V.

Referring to FIG. 8B, a second electrical signal ES2 having a second electric potential V2 that is greater than the standard electric potential RV and different from (e.g., greater than) the first electric potential V1 may be applied to the second transmittance channels TC2 of the guard area GA at the first point t1. For example, the difference between the second electric potential V2 and the standard electric potential RV may be 3V.

Referring to FIG. 8C, a third electrical signal ES3 having a third electric potential V3 that is less than the standard electric potential RV by a second value LL2 may be applied to the third transmittance channels TC3 of the reverse driving area RDA at the first point t1. The second value LL2 may be greater in magnitude that the magnitude of the first value LL1 the first transmittance channels TC1 of the driving area IDA at the first point t1. For example, the difference between the third electric potential V3 and the standard electric potential RV may be –3.58V.

In an embodiment of the present disclosure, when the standard electric potential RV is an earth potential, the first electric potential V1 may be a positive value and the third electric potential V3 may be a negative value.

At the first point t1, the transmittance base capacitors TCB may include a plurality of first capacitors, a plurality of second capacitors and a plurality of third capacitors. The transmittance base capacitors TCB may correspond to capacitors formed between the plurality of transmittance channels TC and the display panel DP, e.g., the transmittance base capacitors TCB may be capacitors formed between the plurality of transmittance channels and the cathode electrode CE. For example, the plurality of first capacitors may be formed between the first transmittance channels TC1 in the driving area IDA and the display panel DP. Particularly, the plurality of first capacitors may be formed between the first sub transmittance channel through the tenth sub transmittance channel and the display panel DP. The plurality of first capacitors may be configured to store electric energy having a first energy value.

The plurality of second capacitors may be formed between the second transmittance channels TC2 in the guard area GA and the display panel DP. Particularly, the plurality of second capacitors may be formed between the eleventh sub transmittance channel through the thirteenth sub transmittance channel and the display panel DP. The plurality of second capacitors may be configured to store electric energy having a second energy value.

The plurality of third capacitors may be formed between a portion of the third transmittance channels TC3 in the non-driving area NDA and the display panel DP. Particularly, the plurality of third capacitors may be formed between the fifteenth sub transmittance channel through the eighteenth sub transmittance channel and the display panel DP. The plurality of third capacitors may be configured to store electric energy having a third energy value.

In an embodiment of the present disclosure, a sum of the first energy E1 and the second energy E2 divided by the third energy E3 may lie in a predetermined range, e.g., 0.95 or more and 1.05 or less. For example, in one practical application, the sum of the first energy E1 and the second energy E2 divided by the third energy E3 may be 1. However, the present disclosure is not limited thereto, and the sum of the first energy E1 and the second energy E2 divided by the third energy E3 may lie in a different range of values in other embodiments.

In an embodiment of the present disclosure, the sum of energy in the driving area IDA and the energy in the guard area GA may be offset by energy in the reverse driving area RDA. This may result from driving the transmittance channels TC3 in the non-driving area NDA in antiphase (e.g., 180° out of phase) with the phase used to drive the transmittance channels TC1 in the display area IDA. Because energy in a positive direction is substantially the same as energy in a negative direction in terms of magnitude as described above (e.g., when the sum of the first energy E1 and the second energy E2 divided by the third energy E3 is 0.95 or more and 1.05 or less), electromagnetic interference (EMI) emitted from the input sensor circuit ISC at the first point t1 may be reduced or canceled. Even when the sum of the first energy E1 and the second energy E2 divided by the third energy E3 lies does not lie in the predetermined range of 0.95 to 1.05, a partial offset of the energies may result to reduce EMI. The reduction in EMI may prevent operation of the input sensor circuit ISC from adversely affecting other electronic circuits in the mobility device, e.g., other systems or circuits in the vehicle.

Table 1 shows examples of specific electric potential values at the first point t1 according to an embodiment of the present disclosure. However, the present disclosure is not limited to what is shown in the Table 1, and the voltage applied to the driving area IDA may be different in other embodiments.

TABLE 1

| Transmittance Channel | TCB | Normalize | Potential Difference | Energy | Total |
|---|---|---|---|---|---|
| 1 | 77250 | 1 | Self 0.5v | 0.50 | 13.3 |
| 2 | 75170 | 0.97 | Self 0.5v | 0.49 | |
| 3 | 74226 | 0.96 | Self 0.5v | 0.48 | |
| 4 | 74001 | 0.96 | Self 0.5v | 0.48 | |
| 5 | 73588 | 0.95 | Self 0.5v | 0.48 | |
| 6 | 73580 | 0.95 | Self 0.5v | 0.48 | |
| 7 | 73761 | 0.95 | Self 0.5v | 0.48 | |
| 8 | 74253 | 0.96 | Self 0.5v | 0.48 | |
| 9 | 75464 | 0.98 | Self 0.5v | 0.49 | |
| 10 | 71954 | 0.93 | Self 0.5v | 0.47 | |
| 11 | 74137 | 0.96 | Guard 3v | 2.88 | |
| 12 | 72647 | 0.94 | Guard 3v | 2.82 | |
| 13 | 72227 | 0.93 | Guard 3v | 2.80 | |
| 14 | 72335 | 0.94 | | | 13.3 |
| 15 | 72104 | 0.93 | Reverse 3.58 | 3.33 | |
| 16 | 71597 | 0.93 | Reverse 3.58 | 3.33 | |
| 17 | 71546 | 0.93 | Reverse 3.58 | 3.33 | |
| 18 | 70797 | 0.92 | Reverse 3.58 | 3.29 | |
| 19 | 71082 | 0.92 | | | |

The transmittance base capacitor TCB in Table 1 is a capacitance between the transmittance channel TC and the display panel DP.

The value under Normalize in Table 1 is a calculated value of weight on each transmittance channel TC based on the transmittance base capacitor TCB of the first sub transmittance channel. The value is rounded up from the third decimal number to the second decimal number for convenience.

The value under Energy in Table 1 is calculated by multiplying the Normalize value by the potential difference and corresponds to an amount of energy stored by the corresponding capacitor.

The value under Total in Table 1 can be calculated by addition of Energy value. As an example, sum of the energy in the driving area IDA and the energy in the guard area GA may have the same absolute value as the energy in the reverse driving area RDA.

Figure 9:
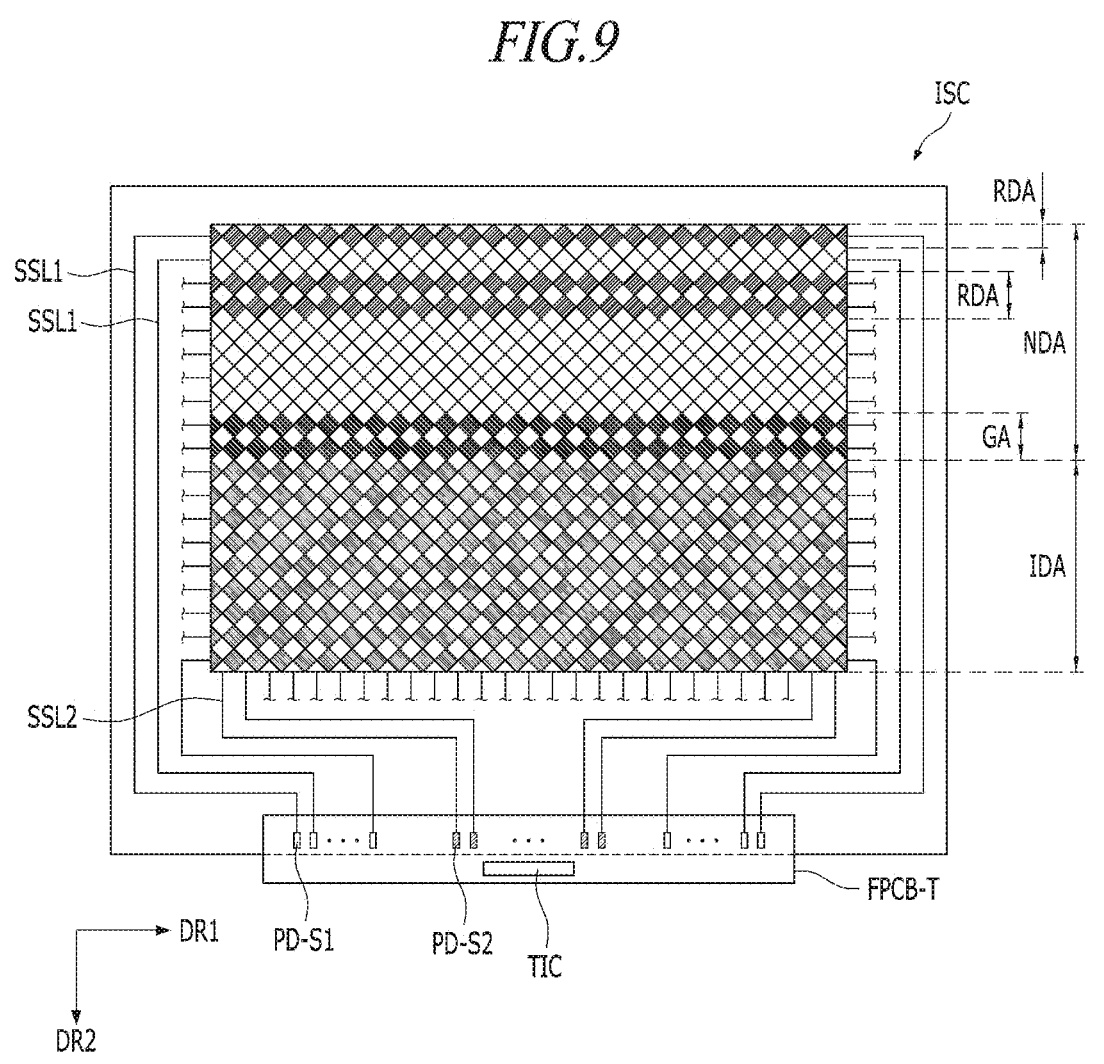

FIG. 9 is an exemplary illustration of the input sensor circuit ISC shown in FIG. 6 at the second point t2. Particularly, the driving area IDA and the non-driving area NDA of the input sensor circuit ISC are distinguished based on the second point t2. Explanation of the driving area IDA, the non-driving area NDA, the guard area GA and the reverse driving area RDA is substantially the same as in FIG. 7, and therefore omitted.

Some of the first transmittance channels TC1 at the second point t2 may be configured to operate as the reverse driving area RDA. Particularly, the first sub transmittance channel, the third sub transmittance channel and the fourth sub transmittance channel (e.g., the first, the third, and the fourth transmittance channels from the top in the second direction) may be configured to operate as the reverse driving area RDA. In addition, other ones of the first transmittance channels TC1 may be configured to operate as the guard area GA in the second point t2. Particularly, the nineth sub transmittance channel and the tenth sub transmittance channel (e.g., the nineth and the tenth transmittance channels from the top in the second direction) may be configured to operate as the guard area GA.

The second transmittance channels TC2 and the third transmittance channels TC3 may be configured to operate as the driving area IDA in the second point t2. Particularly, the eleventh sub transmittance channel through the nineteenth sub transmittance channel (e.g., the eleventh through the nineteenth transmittance channels in the second direction) may be configured to operate as the driving area IDA.

Figure 10A:
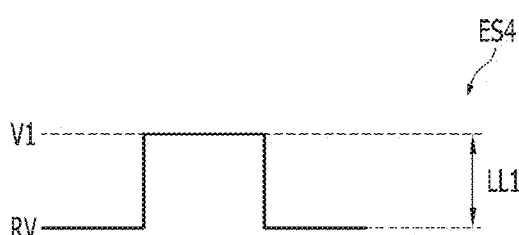
FIGS. 10A to 10C illustrate a signal applied to the input sensor circuit shown in FIG. 9 according to an embodiment of the present disclosure.
Figure 10B:
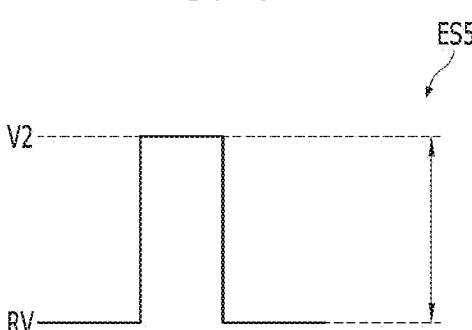
Figure 10C:
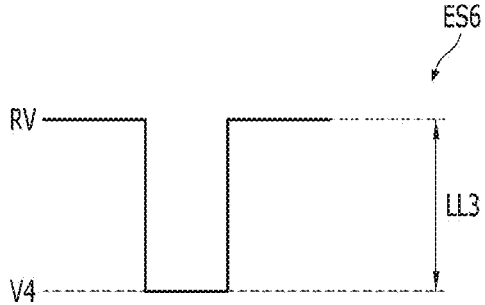

FIGS. 10A to 10C illustrate an example of an electrical signal ES applied to the transmittance channels of each area in the input sensor circuit ISC shown in FIG. 9. Particularly, each of FIGS. 10A to 10C is an exemplary illustration of an electrical signal ES applied at the second point t2 where the transmittance electrodes TS are operating. In an embodiment of the present disclosure, a minimum number of bursts of the electrical signal ES applied to the transmittance channels TC is illustrated, but the number is not limited thereto. The number of bursts of the electrical signal ES applied to the transmittance channels TC may be increased.

In the present disclosure, the electrical signal ES applied to the transmittance channels TC includes a plurality of electrical signals exemplarily illustrated as square waves. However, the present disclosure is not limited to what is illustrated in FIGS. 10A to 10C, and the signals applied to the transmittance channels TC may be other types of waveform, e.g., a sinusoidal wave, a triangular wave, a pulse wave or a sawtooth wave. In the following discussion, the electrical signal ES includes a fourth electrical signal ES4, a fifth electrical signal ES5, and the sixth electrical signal ES6.

Referring to FIG. 10A, the fourth electrical signal ES4, having a first electric potential V1 that is greater than the standard electric potential RV by a first value LL1, may be applied to the second transmittance channels TC2 and the third transmittance channels TC3 of the driving area IDA at the second point t2. For example, the difference between the first electric potential V1 and the standard electric potential RV may be 0.5V.

Referring to FIG. 10B, the fifth electrical signal ES5, having a second electric potential V2 that is greater than the standard electric potential RV and different from the first electric potential V1, may be applied to the first transmittance channels TC1 of the guard area GA in the second point t2. For example, the difference between the second electric potential V2 and the standard electric potential RV may be 3V.

Referring to FIG. 10C, the sixth electrical signal ES6, having a fourth electric potential V4 that is less than the standard electric potential RV by a third value LL3, may be applied to the first transmittance channels TC1 of the reverse driving area RDA at the second point t2. For example, the difference between the fourth electric potential V4 and the standard electric potential RV may be −3.4V.

In an embodiment of the present disclosure, when the standard electric potential RV is an earth potential, the first electric potential V1 and second electric potential V2 may be positive values and the fourth electric potential V4 may be a negative value. These positive and negative values may generate corresponding energies that offset to reduce EMI emitted from the input sensor circuit.

The transmittance base capacitors TCB may include a plurality of fourth capacitors, a plurality of fifth capacitors, a plurality of sixth capacitors and a plurality of seventh capacitors at the second point t2. The plurality of fourth capacitors may be formed between a portion of the first transmittance channels TC1 and the display panel DP. Particularly, the plurality of fourth capacitors may be formed between the nineth sub transmittance channel through the tenth sub transmittance channel and the display panel DP. The plurality of fourth capacitors may be configured to store electric energy having a fourth energy value.

The plurality of fifth capacitors may be formed between the other portion of the first transmittance channels TC1 and the display panel DP. Particularly, the plurality of fifth capacitors may be formed between the first sub transmittance channel, the third sub transmittance channel and the fourth sub transmittance channel and the display panel DP. The plurality of fifth capacitors may be configured to store electric energy having a fifth energy value.

The plurality of sixth capacitors may be formed between the second transmittance channels TC2 and the display panel DP. Particularly, the plurality of sixth capacitors may be formed between the eleventh sub transmittance channel through the thirteenth sub transmittance channel and the display panel DP. The plurality of sixth capacitors may be configured to store electric energy having a sixth energy value.

The plurality of seventh capacitors may be formed between the third transmittance channels TC3 and the display panel DP. Particularly, the plurality of seventh capacitors may be formed between the fourteenth sub transmittance channel through the nineteenth sub transmittance channel. The plurality of seventh capacitors may be configured to store electric energy having a seventh energy value.

In an embodiment of the present disclosure, a sum of the fourth energy E4, the sixth energy E6 and the seventh energy E7 divided by the fifth energy E5 may be lie in a predetermined range, e.g., 0.95 or greater and 1.05 or less. For example, the sum of the fourth energy E4, the sixth energy E6 and the seventh energy E7 divided by the fifth energy E5 may be 1. However, the present disclosure is not limited thereto, and the sum of the fourth energy E4, the sixth energy E6 and the seventh energy E7 divided by the fifth energy E5 may lie in a different range in another embodiment.

In an embodiment of the present disclosure, a sum of energy in the driving area IDA and energy in the guard area GA may be offset by energy in the reverse driving area RDA. This is because the positive energy stored by the capacitors in the driving area IDA and guard area GA is substantially the same as the negative energy stored in the capacitors in the reverse driving area RDA. As a result, EMI emitted from the input sensor circuit ISC at the second point may be reduced or canceled, which will reduce any adverse effect of the input sensor circuit on operation of other circuits in the vicinity of the input sensor circuit, e.g., on other circuits found in a vehicle or other mobility device.

Table 2 shows examples of electric potential values at the second point t2 according to an embodiment of the present disclosure. However, the present disclosure is not limited to what is shown in the table, and a voltage applied to the driving area IDA may be freely modified.

TABLE 2

| Transmittance Channel | TCB | Normalize | Potential Difference | Energy | Total |
|---|---|---|---|---|---|
| 1 | 77250 | 1 | Reverse 3.4 | 3.40 | 9.9 |
| 2 | 75170 | 0.97 | | | |
| 3 | 74226 | 0.96 | Reverse 3.4 | 3.27 | |
| 4 | 74001 | 0.96 | Reverse 3.4 | 3.26 | |
| 5 | 73588 | 0.95 | | | |
| 6 | 73580 | 0.95 | | | |
| 7 | 73761 | 0.95 | | | |
| 8 | 74253 | 0.96 | | | |
| 9 | 75464 | 0.98 | Guard 3v | 2.93 | 9.9 |
| 10 | 71954 | 0.93 | Guard 3v | 2.79 | |
| 11 | 74137 | 0.96 | Self 0.5v | 0.48 | |
| 12 | 72647 | 0.94 | Self 0.5v | 0.47 | |
| 13 | 72227 | 0.93 | Self 0.5v | 0.47 | |
| 14 | 72335 | 0.94 | Self 0.5v | 0.47 | |
| 15 | 72104 | 0.93 | Self 0.5v | 0.47 | |
| 16 | 71597 | 0.93 | Self 0.5v | 0.46 | |
| 17 | 71546 | 0.93 | Self 0.5v | 0.46 | |
| 18 | 70797 | 0.92 | Self 0.5v | 0.46 | |
| 19 | 71082 | 0.92 | Self 0.5v | 0.46 | |

Explanations of the transmittance base capacitor TCB, Normalize value, Energy value and Total value in Table 2 are substantially the same as what is explained for Table 1 above, and therefore omitted.

Figure 11:
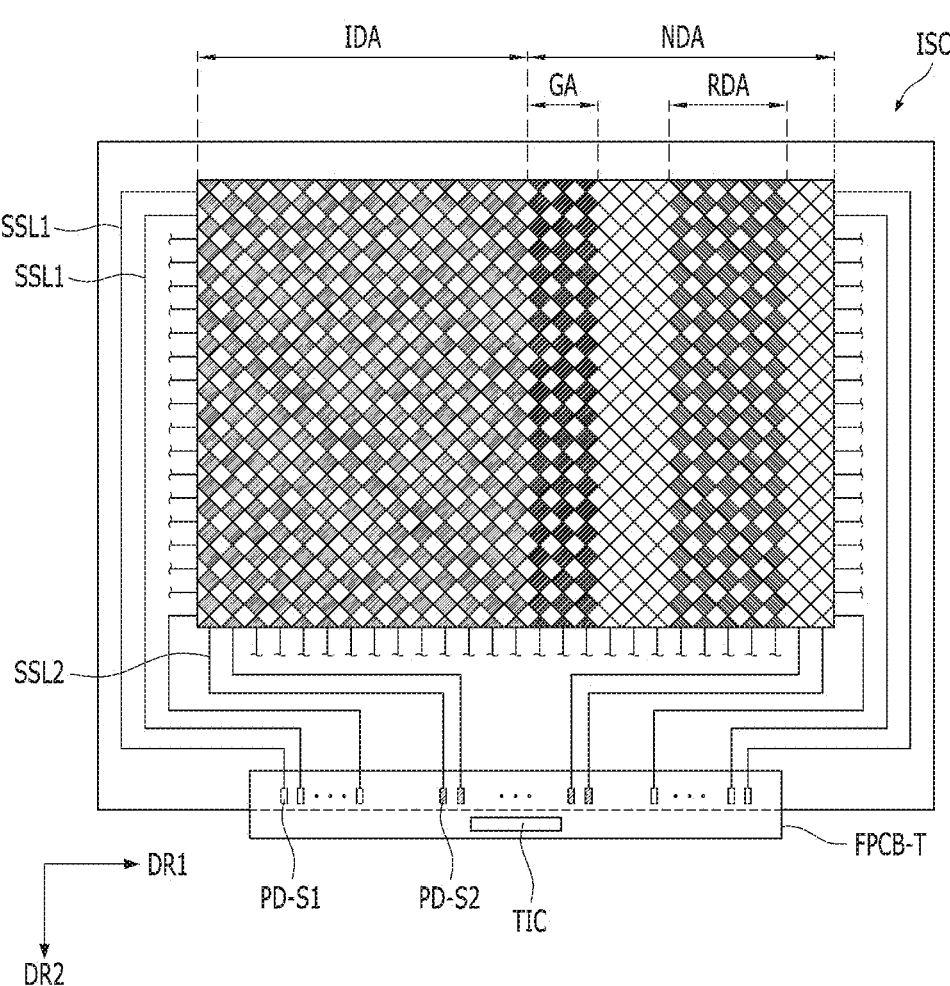
FIG. 11 illustrate the input sensor circuit shown in FIG. 6 viewed from a third point of view according to an embodiment of the present disclosure.

FIG. 11 is an exemplary illustration of the input sensor circuit ISC shown in FIG. 6 at a third point t3. Particularly, the driving area IDA and the non-driving area NDA of the input sensor circuit ISC at the third point t3 are distinguished Explanations on the driving area IDA, the non-driving area NDA, the guard area GA and the reverse driving area RDA are substantially the same as what is explained for FIG. 7, and therefore omitted.

The first sub receiver channel through the fourteenth sub receiver channel (e.g., fourteen receiver channels from the left in the first direction) at the third point t3 may be configured to operate as the driving area IDA. The fifteenth sub receiver channel through the seventeenth sub receiver channel (e.g., the fifteenth through the seventeenth receiver channels from the left in the first direction) at the third point t3 may be configured to operate as the guard area GA. The twenty first sub receiver channel through the twenty fifth sub receiver channel (e.g., the twenty first through the twenty fifth receiver channels from the left in the first direction) at the third point t3 may be configured to operate as the reverse driving area RDA.

Figure 12A:
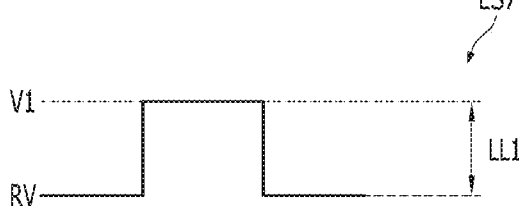
FIGS. 12A to 12C illustrate of a signal applied to the input sensor circuit shown in FIG. 11 according to an embodiment of the present disclosure.
Figure 12B:
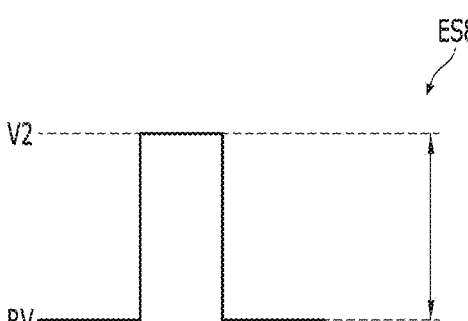
Figure 12C:
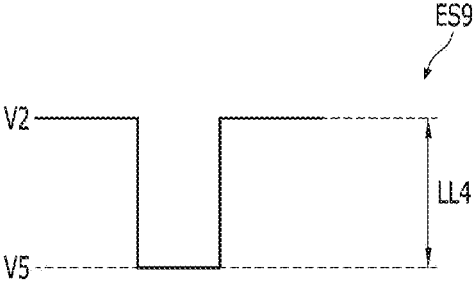

FIGS. 12A to 12C illustrate an example of an electrical signal ES applied to the receiver channels in each area of the input sensor circuit ISC shown in FIG. 11. Particularly, each of FIG. 12A, FIG. 12B and FIG. 12C exemplarily illustrates the electrical signal ES applied to the receiver channels at the third point t3 where the receiver electrodes RS are operating.

In an embodiment of the present disclosure, a minimum number of bursts of the electrical signal ES applied to the receiver channels RC is illustrated, but the present disclosure is not limited thereto. The number of bursts of the electrical signal ES applied to the receiver channels RC may be increased.

In the present disclosure, the electrical signal ES applied to each of the receiver channels RS is exemplarily illustrated as a square wave. However, the present disclosure is not limited to what is illustrated in the figure, and the signal applied to the receiver channels RC may be another waveform, e.g., a sinusoidal wave, a triangular wave, a pulse wave or a sawtooth wave.

Referring to FIG. 12A, a seventh electrical signal ES7, having a first electric potential V1 that is greater than the standard electric potential RV by a first value LL1, may be applied to the first receiver channels RC1 of the driving area IDA at the third point t3. For example, the difference between the first electric potential V1 and the standard electric potential RV may be 0.5V.

Referring to FIG. 12B, an eighth electrical signal ES8, having a second electric potential V2 that is greater than the standard electric potential RV and different from the first electric potential V1, may be applied to the second receiver channels RC2 of the guard area GA at the third point t3. For example, the difference between the second electric potential V2 and the standard electric potential RV may be 3V.

Referring to FIG. 12C, a nineth electrical signal ES9, having a fifth electric potential V5 that is less than the standard electric potential RV by a fourth value LL4, may be applied to the third receiver channels RC3 of the reverse driving area RDA at the third point t3. For example, the difference between the fifth electric potential V5 and the standard electric potential RV may be −3.21V.

In an embodiment of the present disclosure, when the standard electric potential RV is an earth potential, the first electric potential V1 and the second electric potential may be positive values and the fifth electric potential V5 may be a negative value.

At the third point t3, the receiver base capacitors RCB may include a plurality of eighth capacitors, a plurality of nineth capacitors and a plurality of tenth capacitors. The plurality of eighth capacitors may be formed between the first receiver channels RC1 and the display panel DP. For example, the plurality of eighth capacitors may be formed between the first sub receiver channel through the fourteenth sub receiver channel and the display panel DP. The plurality of eighth capacitors may be configured to store electric energy having an eighth energy value The plurality of nineth capacitors may be formed between the second receiver channels RC2 and the display panel DP. For example, the plurality of nineth capacitors may be formed between the fifteenth sub receiver channel through the seventeenth sub receiver channel and the display panel DP. The plurality of nineth capacitors may be configured to store electric energy having a nineth energy value.

The plurality of tenth capacitors may be formed between a portion of the third receiver channels RC3 and the display panel DP. For example, the plurality of tenth capacitors may be formed between the twenty first sub receiver channel through the twenty fifth sub receiver channel and the display panel DP. The plurality of tenth capacitors may be configured to store electric energy having a tenth energy value.

The electric energy stored by these capacitors is based on the sign (or polarity) and magnitude of the voltage of the applied electrical signals. The polarity may be positive or negative. In an embodiment of the present disclosure, a sum of the eighth energy E8 and the nineth energy E9 divided by the tenth energy E10 may lie in a predetermined range, e.g., may be 0.95 or greater and 1.05 or less. In one embodiment, the sum of the eighth energy E8 and the nineth energy E9 divided by the tenth energy E10 may be 1. However, the present disclosure is not limited thereto, and the sum of the eighth energy E8 and the nineth energy E9 divided by the tenth energy E10 may be different in other embodiments. In an embodiment of the present disclosure, a sum of the positive energy in the driving area IDA and the positive energy in the guard area GA may be offset by the negative energy in the reverse driving area RDA. Because the sum of the positive energies is substantially the same as energy in the negative energy as above, EMI emitted from the input sensor circuit ISC at the third point t3 may be reduced.

Table 3 provides examples of specific electric potential values at the third point t3 according to an embodiment of the present disclosure. However, the present disclosure is not limited to what is shown in the table, and the voltage applied to the driving area IDA may be freely modified.

TABLE 3

| Receiver Channel | RCB | Normalize | Potential Difference | Energy | Total |
|---|---|---|---|---|---|
| 1 | 117238 | 1 | Self 0.5v | 0.50 | 16.5 |
| 2 | 117142 | 0.999 | Self 0.5v | 0.50 | |
| 3 | 118279 | 1.009 | Self 0.5v | 0.50 | |
| 4 | 118847 | 1.014 | Self 0.5v | 0.51 | |
| 5 | 118864 | 1.014 | Self 0.5v | 0.51 | |
| 6 | 119352 | 1.018 | Self 0.5v | 0.51 | |
| 7 | 120121 | 1.025 | Self 0.5v | 0.51 | |
| 8 | 121889 | 1.040 | Self 0.5v | 0.52 | |
| 9 | 121465 | 1.036 | Self 0.5v | 0.52 | |
| 10 | 123643 | 1.055 | Self 0.5v | 0.53 | |
| 11 | 124108 | 1.059 | Self 0.5v | 0.53 | |
| 12 | 124916 | 1.065 | Self 0.5v | 0.53 | |
| 13 | 127261 | 1.085 | Self 0.5v | 0.54 | |
| 14 | 123923 | 1.057 | Self 0.5v | 0.53 | |
| 15 | 121249 | 1.034 | Guard 3v | 3.10 | |
| 16 | 121409 | 1.036 | Guard 3v | 3.11 | |
| 17 | 121057 | 1.033 | Guard 3v | 3.10 | |
| 18 | 119080 | 1.016 | | | 16.5 |
| 19 | 119192 | 1.017 | | | |
| 20 | 119056 | 1.016 | | | |
| 21 | 119256 | 1.017 | Reverse 3.21v | 3.27 | |
| 22 | 119352 | 1.018 | Reverse 3.21v | 3.27 | |
| 23 | 119808 | 1.022 | Reverse 3.21v | 3.28 | |
| 24 | 121649 | 1.038 | Reverse 3.21v | 3.33 | |
| 25 | 122546 | 1.045 | Reverse 3.21v | 3.36 | |
| 26 | 123259 | 1.051 | | | |
| 27 | 123523 | 1.054 | | | |

The receiver base capacitor RCB shown in Table 3 is a capacitance between the receiver channel RC and the display panel DP.

The value under Normalize in Table 3 is a calculated value of weight on each receiver channel RC based on the receiver base capacitor RCB of the first sub receiver channel. The value is rounded up from the fourth decimal number to the third decimal number for convenience.

The value under Energy in Table 3 is a calculated value by multiplying Normalize value by the potential difference and corresponds to an amount of energy stored by the corresponding capacitor.

The value under Total in Table 3 may be obtained by adding Energy value. As an example, sum of energy of the driving area IDA and energy of the guard area GA may have a same absolute value as energy of the reverse driving area RDA.

Figure 13:
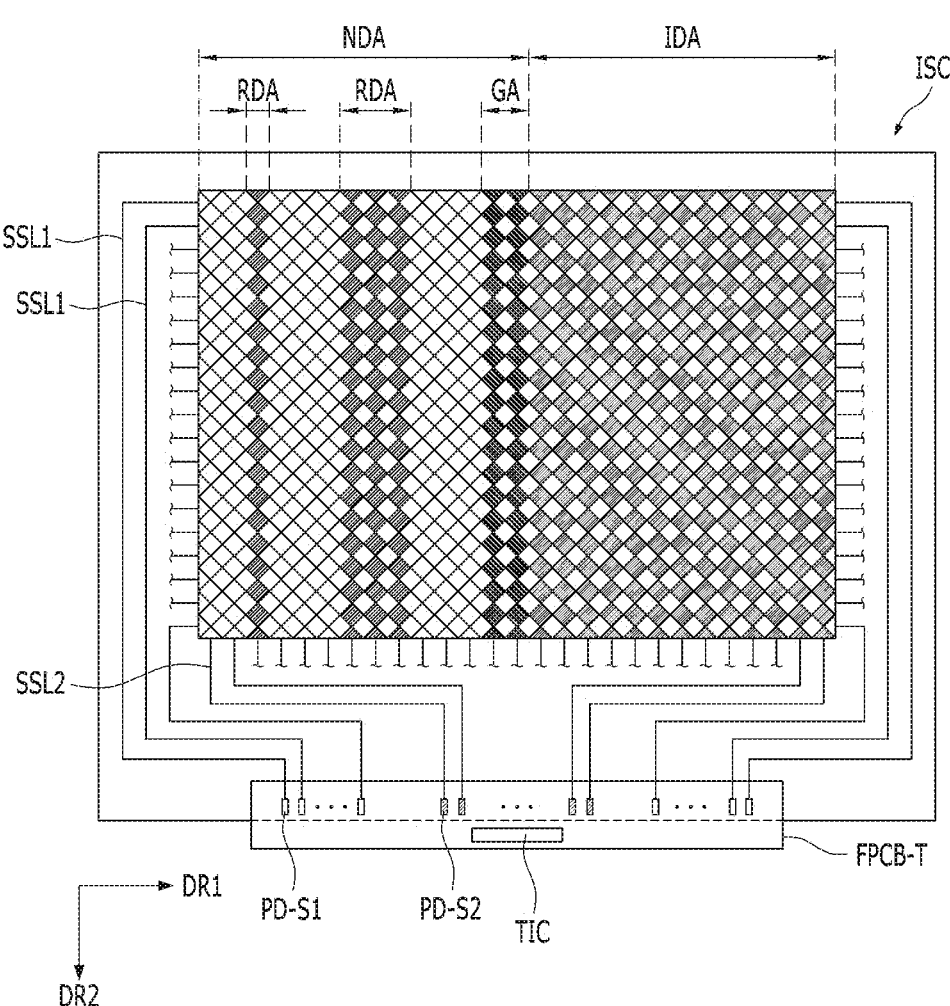
FIG. 13 illustrates the input sensor circuit shown in FIG. 6 viewed from a fourth point of view according to an embodiment of the present disclosure.

FIG. 13 is an exemplary illustration of the input sensor circuit ISC shown in FIG. 6 at a fourth point t4. Particularly, the driving area IDA and the non-driving area NDA of the input sensor circuit ISC at the fourth point t4 are distinguished. Explanations on the driving area IDA, the non-driving area NDA, the guard area GA and the reverse driving area RDA are substantially the same as what is explained for FIG. 7, and therefore omitted. A fifteenth sub receiver channel through a twenty seventh sub receiver channel (e.g., a fifteenth through twenty seventh receiver channels from the left in the first direction) at the fourth point t4 may be configured to operate as the driving area IDA. A thirteenth sub receiver channel through a fourteenth sub receiver channel (e.g., a thirteenth through a fourteenth receiver channels from the left in the first direction) at the fourth point t4 may be configured to operate as the guard area GA. A third sub receiver channel, a seventh sub receiver channel, an eighth sub receiver channel and a nineth sub receiver channel (e.g., a third, a seventh, an eighth and a nineth receiver channels from the left in the first direction) at the fourth point t4 may be configured to operate as the reverse driving area RDA.

Figure 14A:
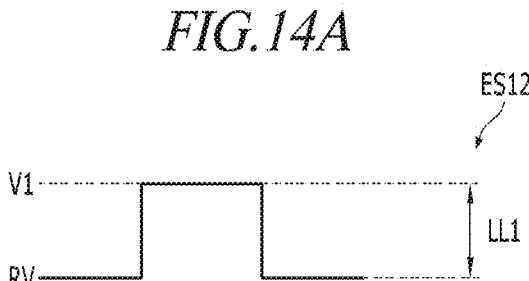
FIGS. 14A to 14C illustrates a signal applied to the input sensor circuit shown in FIG. 13 according to an embodiment of the present disclosure.
Figure 14B:
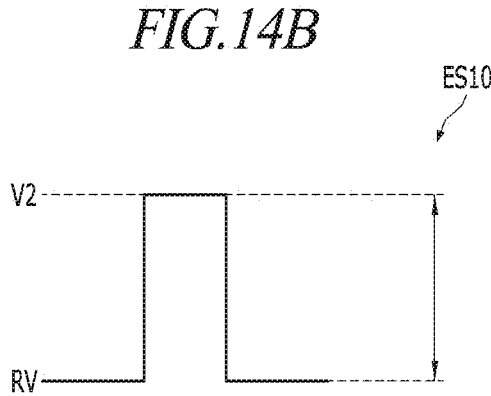
Figure 14C:
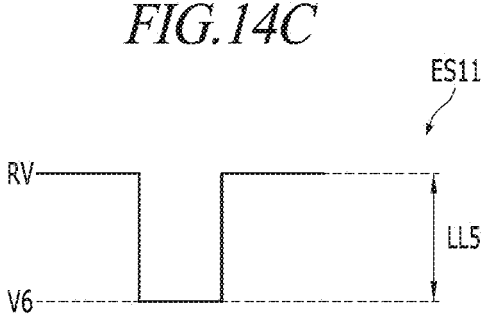

FIGS. 14A to 14C illustrate an example of an electrical signal ES applied to the receiver channels in each area of the input sensor circuit ISC shown in FIG. 13. Particularly, each of FIG. 14A, FIG. 14B and FIG. 14C is an exemplary illustration of an electrical signal ES applied at the fourth point t4 where the receiver electrodes RS are operating.

In an embodiment of the present disclosure, a minimum number of bursts of the electrical signal ES applied to the receiver channels RC is illustrated. However, the present disclosure is not limited thereto, and the number of bursts of the electrical signal ES applied to the receiver channels RC may be increased.

In the present disclosure, the electrical signal ES applied to the receiver channels RC is exemplarily illustrated as a square wave. However, the present disclosure is not limited to what is illustrated in FIGS. 14A to 14C, and the signal applied to the receiver channels RC may be a different waveform, e.g., a sinusoidal wave, a triangular wave, a pulse wave or a sawtooth wave.

Referring to FIG. 14A, a twelfth electrical signal ES12, having a first electric potential that is greater than the standard electric potential RV by a first value LL1, may be applied to the second receiver channels RC2 and the third receiver channels RC3 of the driving area IDA at the fourth point t4. For example, the difference between the first electric potential V1 and the standard electric potential RV may be 0.5V.

Referring to FIG. 14B, a tenth electrical signal ES10, having a second electric potential V2 that is greater than the standard electric potential RV and different from the first electric potential V1, may be applied to the first receiver channels RC1 of the guard area GA at the fourth point t4. For example, the difference between the second electric potential V2 and the standard electric potential RV may be 3V.

Referring to FIG. 14C, an eleventh electrical signal ES11, having a sixth electric potential V6 that is less than the standard electric potential RV by a fifth value LL5, may be applied to the first receiver channels RC1 of the reverse driving area RDA at the fourth point t4. For example, the difference between the sixth electric potential V6 and the standard electric potential RV may be −3.2V.

In an embodiment of the present disclosure, when the standard electric potential RV is an earth potential, the first electric potential V1 and the second electric potential V2 may be positive values and the sixth electric potential V6 may be a negative value. These potential values affect the type (or sign, negative or positive) of the energy stored in capacitors of corresponding ones of the receiver channels.

For example, at the fourth point t4, the receiver base capacitors RCB may include a plurality of eleventh capacitors, a plurality of twelfth capacitors, a plurality of thirteenth capacitors and a plurality of fourteenth capacitors. The plurality of eleventh capacitors may be formed between a portion of the first receiver channels RC1 and the display panel DP. For example, the plurality of eleventh capacitors may be formed between the thirteenth sub receiver channel through the fourteenth sub receive channel and the display panel DP. The plurality of eleventh capacitors may be configured to store electric energy having an eleventh energy value.

The plurality of twelfth capacitors may be formed between the other portion of the first receiver channels RC1 and the display panel DP. For example, the plurality of twelfth capacitors may be formed between the third sub receiver channel, the seventh sub receiver channel, the eighth sub receiver channel and the nineth sub receiver channel and the display panel DP. The plurality of twelfth capacitors may be configured to store electric energy having a twelfth energy value.

The plurality of thirteenth capacitors may be formed between the second receiver channels RC2 and the display panel DP. For example, the plurality of thirteenth capacitors may be formed between the fifteenth sub receiver channel through the seventeenth sub receiver channel and the display panel DP. The plurality of thirteenth capacitors may be configured to store electric energy having a thirteenth energy value.

The plurality of fourteenth capacitors may be formed between the third receiver channels RC3 and the display panel DP. For example, the plurality of fourteenth capacitors may be formed between the eighteenth sub receiver channel through the twenty seventh sub receiver channel and the display panel DP. The plurality of fourteenth capacitors may be configured to store electric energy having a fourteenth energy value.

In an embodiment of the present disclosure, a sum of the eleventh energy E11, the thirteenth energy E13 and the fourteenth energy E14 divided by the twelfth energy E12 may lie in a predetermined range, e.g., be 0.95 or greater and 1.05 or less. In one example, a sum of the eleventh energy E11, the thirteenth energy E13 and the fourteenth energy E14 divided by the twelfth energy E12 may be 1. However, the present disclosure is not limited thereto, and the sum of the eleventh energy E11, the thirteenth energy E13 and the fourteenth energy E14 divided by the twelfth energy E12 may be different in other embodiments.

In an embodiment of the present disclosure, the sum of energy in the driving area IDA and energy in the guard area GA (which are positive energies) may be offset by (the negative) energy in the reverse driving area RDA. Because the sum of positive energies is substantially the same as the negative energy as described above, EMI emitted from the input sensor circuit ISC at the fourth point t4 may be reduced or canceled, thereby preventing any adverse affect of other electronic circuits in the vicinity of the input sensor circuit ISC.

Table 4 shows examples of electric potential values at the fourth point t4 according to an embodiment of the present disclosure. However, the present disclosure is not limited thereto, and a voltage applied to the driving area IDA may be freely modified.

TABLE 4

| Receiver Channel | RCB | Normalize | Potential Difference | Energy | Total |
|---|---|---|---|---|---|
| 1 | 117238 | 1 | | | 13.1 |
| 2 | 117142 | 0.999 | | | |
| 3 | 118279 | 1.009 | Reverse 3.2v | 3.23 | |
| 4 | 118847 | 1.014 | | | |
| 5 | 118864 | 1.014 | | | |
| 6 | 119352 | 1.018 | | | |
| 7 | 120121 | 1.025 | Reverse 3.2v | 3.28 | |

TABLE 4-continued

| Receiver Channel | RCB | Normalize | Potential Difference | Energy | Total |
|---|---|---|---|---|---|
| 8 | 121889 | 1.040 | Reverse 3.2v | 3.33 | |
| 9 | 121465 | 1.036 | Reverse 3.2v | 3.32 | |
| 10 | 123643 | 1.055 | | | |
| 11 | 124108 | 1.059 | | | |
| 12 | 124916 | 1.065 | | | |
| 13 | 127261 | 1.085 | Guard 3v | 3.26 | 13.1 |
| 14 | 123923 | 1.057 | Guard 3v | 3.17 | |
| 15 | 121249 | 1.034 | Self 0.5v | 0.52 | |
| 16 | 121409 | 1.036 | Self 0.5v | 0.52 | |
| 17 | 121057 | 1.033 | Self 0.5v | 0.52 | |
| 18 | 119080 | 1.016 | Self 0.5v | 0.51 | |
| 19 | 119192 | 1.017 | Self 0.5v | 0.51 | |
| 20 | 119056 | 1.016 | Self 0.5v | 0.51 | |
| 21 | 119256 | 1.017 | Self 0.5v | 0.51 | |
| 22 | 119352 | 1.018 | Self 0.5v | 0.51 | |
| 23 | 119808 | 1.022 | Self 0.5v | 0.51 | |
| 24 | 121649 | 1.038 | Self 0.5v | 0.52 | |
| 25 | 122546 | 1.045 | Self 0.5v | 0.52 | |
| 26 | 123259 | 1.051 | Self 0.5v | 0.53 | |
| 27 | 123523 | 1.054 | Self 0.5v | 0.53 | |

The receiver base capacitor RCB shown in Table 4 is a capacitance between the receiver channel RC and the display panel DP.

The value under Normalize in Table 4 is a calculated value of weight on each receiver channel RC based on the receiver base capacitor RCB of the first sub receiver channel. The value is rounded up from the fourth decimal number to the third decimal number for convenience.

The value under Energy in Table 4 is a calculated value by multiplying the Normalize value by the potential difference.

The value under Total in Table 4 is obtained by adding the Energy value. As an example, a sum of energy of the driving area IDA and energy of the guard area GA may have the same absolute value as energy of the reverse driving area RDA.

In FIGS. 7 through 13, the driving area IDA, the guard area GA and the reverse driving area RDA are exemplarily illustrated. The driving area IDA, the guard area GA and the reverse driving area RDA may be modified according to an embodiment of the present disclosure.

Figure 15:
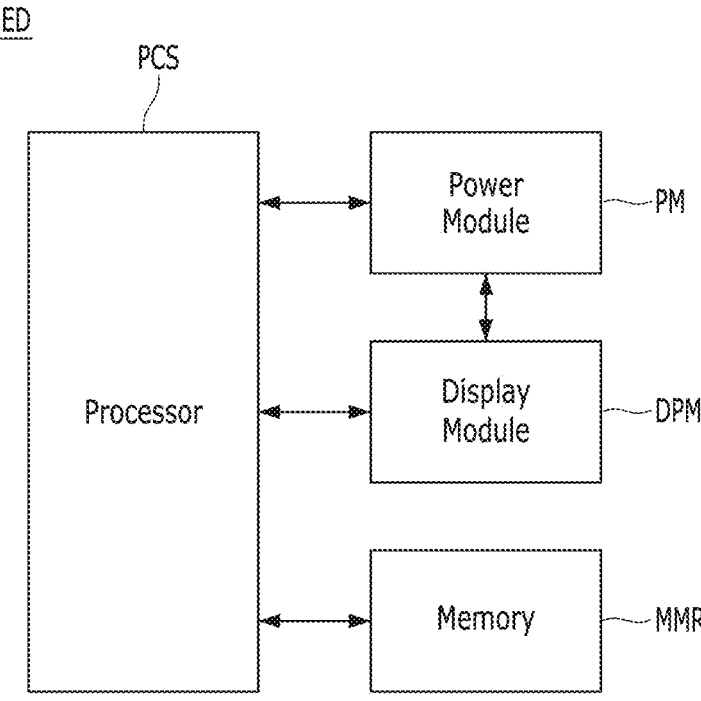
FIG. 15 is an exemplary block diagram of an electronic device according to an embodiment.

Referring to FIG. 15, the electronic device ED according to an embodiment may include a display module DPM, a processor PCS, a memory MMR, and a power module PM.

The processor PCS may include at least one of a central processing unit CPU, an application processor AP, a graphic processing unit GPU, a communication processor CP, an image signal processor ISP, and a controller.

The memory MMR may be configured to store data information for operation of the processor PCS or the display module DPM. In the case that the processor PCS operates an application stored in the memory MMR, the display module DPM may be configured to receive an image data signal and/or an input control signal and process the received signal to provide an output of image information through a display screen.

A power module PM may include a power supply module, such as a power adapter or a battery device, and a power conversion module, which converts power supplied by the power supply module to generate power required for operation of an electronic device ED.

At least one of the elements of the above electronic device ED may be included in the display device according to the above embodiments. In addition, some of individual modules functionally included in a single module may be included in the display device, and the other may be provided separately from the display device. For example, a display module may be included in the display device, and the processor PCS, the memory MMR, and the power module PM may be provided in a form of another device within the electronic device ED other than the display device.

Figure 16:
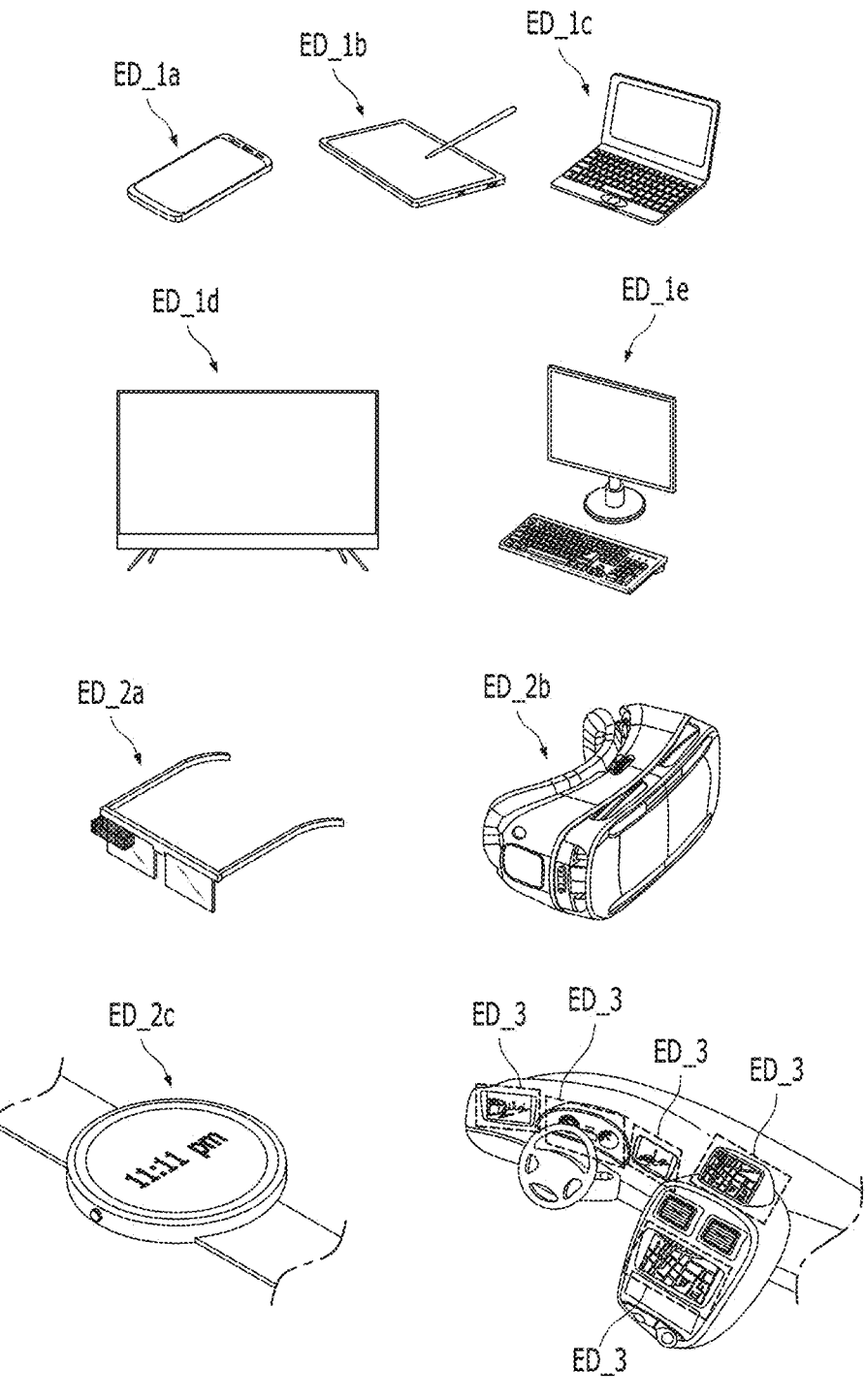
FIG. 16 illustrates schematic diagrams of electronic devices according to different embodiments.

Referring to FIG. 16, various electronic devices having display devices according to embodiments may include not only an image display electronic device, such as a smart phone ED-la, a tablet PC ED-1b, a laptop ED-1c, a TV ED-1d, and a desk monitor ED-1e, but also a wearable electronic device including a display module, such as smart glass ED-2a, a head mounted display ED-2b, and a smart watch ED-2c, and a vehicle electronic device ED-3 including a display module, such as a CID (Center Information Display) and a room mirror display disposed on an instrument panel, center fascia, and a dashboard of an automobile. While certain embodiments of the present disclosure have been described above, anyone ordinarily skilled in the art to which the present disclosure pertains shall appreciate that there may be a variety of modifications and permutations of the present disclosure without departing from the technical ideas and scopes of the present disclosure that are defined in the appended claims. Moreover, it shall be appreciated that the disclosed embodiments are not intended to restrict the present disclosure thereto and that every technical idea within the appended claims and their equivalents is interpreted to be included in the scope of the present disclosure. The embodiments may be combined to form additional embodiments.

What is claimed is:

1. A display module comprising:

a display panel; and an input sensor circuit disposed on the display panel and comprising a plurality of transmittance channels and a plurality of receiver channels, wherein each of the plurality of transmittance channels extends in a first direction and the plurality of transmittance channels are arranged in a second direction intersecting the first direction, wherein each of the plurality of receiver channels extends in the second direction and the plurality of receiver channels are arranged in the first direction, wherein each of first transmittance channels among the plurality of transmittance channels is applied with a first electrical signal having a first electric potential that is greater than a standard electric potential by a first value at a first point, wherein each of second transmittance channels adjacent to the first transmittance channels among the plurality of transmittance channels is applied with a second electrical signal having a second electric potential that is different from the first electric potential at the first point, wherein each of a portion of third transmittance channels adjacent to the second transmittance channels among the plurality of transmittance channels is applied with a third electrical signal having a third electric potential that is less than the standard electric potential by a second value at the first point, and wherein the second value is greater than the first value.

2. The display module of claim 1, wherein:

a plurality of first capacitors between the first transmittance channels and an electrode of the display panel are configured to store electric energy having a first energy value, a plurality of second capacitors between the second transmittance channels and the electrode of the display panel are configured to store electric energy having a second energy value, a plurality of third capacitors between the portion of third transmittance channels and the electrode of the display panel are configured to store electric energy having a third energy value, and a sum of the first energy and the second energy divided by the third energy is 0.95 or greater and 1.05 or less.

3. The display module of claim 2, wherein the sum of the first energy and the second energy divided by the third energy is 1.

4. The display module of claim 1, wherein each of the second transmittance channels and the third transmittance channels is applied with a fourth electrical signal having the first electric potential at a second point that is different from the first point, wherein each of a portion of the first transmittance channels adjacent to the second transmittance channels is applied with a fifth electrical signal having the second electric potential at the second point, wherein each of the other portion among the first transmittance channels is applied with a sixth electrical signal having a fourth electric potential that is less than the standard electric potential by a third value at the second point, and wherein the third value is greater than the first value.

5. The display module of claim 4, wherein a plurality of fourth capacitors between the portion among the first transmittance channels and an electrode of the display panel are configured to store electric energy having a fourth energy value, wherein a plurality of fifth capacitors between the other portion among the first transmittance channels and the display panel are configured to store electric energy having a fifth energy value, wherein a plurality of sixth capacitors between the second transmittance channels and the electrode of the display panel are configured to store electric energy having a sixth energy value, wherein a plurality of seventh capacitors between the third transmittance channels and the electrode of the display panel are configured to store electric energy having a seventh energy value, and wherein a sum of the fourth energy, the sixth energy and the seventh energy divided by the fifth energy is 0.95 or greater and 1.05 or less.

6. The display module of claim 5, wherein the sum of the fourth energy, the sixth energy and the seventh energy divided by the fifth energy is 1.

7. The display module of claim 4, wherein first receiver channels among the plurality of receiver channels are applied with a seventh electrical signal having the first electric potential at a third point that is different from the first point and the second point, wherein second receiver channels adjacent to the first receiver channels among the plurality of receiver channels are applied with an eighth electrical signal having the second electric potential at the third point, wherein a portion of third receiver channels adjacent to the second receiver channels among the plurality of receiver channels is applied with a ninth electrical signal having a fifth electric potential that is less than the standard electric potential by a fourth value at the third point, and wherein the fourth value is greater than the first value.

8. The display module of claim 7, wherein a plurality of eighth capacitors between the first receiver channels and an electrode of the display panel are configured to store electric energy having an eighth energy value, wherein a plurality of ninth capacitors between the second receiver channels and the electrode of the display panel are configured to store electric energy having a ninth energy value, wherein a plurality of tenth capacitors between the portion among the third receiver channels and the electrode of the display panel are configured to store electric energy having a tenth energy value, and wherein a sum of the eighth energy and the ninth energy divided by the tenth energy is 0.95 or greater and 1.05 or less.

9. The display module of claim 8, wherein the sum of the eighth energy and the ninth energy divided by the tenth energy is 1.

10. The display module of claim 7, wherein a portion of the first receiver channels adjacent to the second receiver channels is applied with a tenth electrical signal having the second electric potential at a fourth point that is different from the third point, wherein the other portion among the first receiver channels is applied with an eleventh electrical signal having a sixth electric potential that is less than the standard electric potential by a fifth value, wherein the second receiver channels and the third receiver channels are applied with a twelfth electrical signal having the first electric potential at the fourth point, and wherein the fifth value is greater than the first value.

11. The display module of claim 10, wherein:

a plurality of eleventh capacitors between the portion among the first receiver channels and an electrode of the display panel are configured to store electric energy having an eleventh energy value, wherein a plurality of twelfth capacitors between the other portion among the first receiver channels and the electrode of the display panel are configured to store electric energy having a twelfth energy value, wherein a plurality of thirteenth capacitors between the second receiver channels and the display panel are configured to store electric energy having a thirteenth energy value, wherein a plurality of fourteenth capacitors between the third receiver channels and the electrode of the display panel are configured to store electric energy having a fourteenth energy value, and wherein a sum of the eleventh energy, the thirteenth energy and the fourteenth energy divided by the twelfth energy is 0.95 or greater and 1.05 or less.

12. The display module of claim 11, wherein the sum of the eleventh energy, the thirteenth energy and the fourteenth energy divided by the twelfth energy is 1.

13. A display module comprising:

a display panel; and an input sensor circuit disposed on the display panel and comprising a plurality of transmittance electrodes and a plurality of receiver electrodes, wherein two adjacent transmittance electrodes among the plurality of transmittance electrodes are electrically connected in a first direction, wherein two adjacent receiver electrodes among the plurality of receiver electrodes are electrically connected in a second direction intersecting the first direction, wherein each of first transmittance electrodes among the plurality of transmittance electrodes is applied with a first electrical signal having a first electric potential that is greater than a standard electric potential by a first value at a first point, wherein each of second transmittance electrodes among the plurality of transmittance electrodes is applied with a second electrical signal having a second electric potential that is different from the first electric potential at the first point, wherein a portion of third transmittance electrodes among the plurality of transmittance electrodes is applied with a third electrical signal having a third electric potential that is less than the standard electric potential by a second value at the first point, and wherein the second value is greater than the first value.

14. The display module of claim 13, wherein a plurality of first capacitors between the first transmittance electrodes and an electrode of the display panel are configured to store electric energy having a first energy value, wherein a plurality of second capacitors between the second transmittance electrodes and the electrode of the display panel are configured to store electric energy having a second energy value, wherein a plurality of third capacitors between the portion of the third transmittance electrodes and the electrode of the display panel are configured to store electric energy having a third energy value, and wherein a sum of the first energy and the second energy divided by the third energy is 0.95 or greater and 1.05 or less.

15. The display module of claim 13, wherein each of the second transmittance electrodes and the third transmittance electrodes is applied with a fourth electrical signal having the first electric potential at a second point that is different from the first point, wherein each of a portion of the first transmittance electrodes adjacent to the second transmittance electrodes is applied with a fifth electrical signal having the second electric potential at the second point, wherein each of the other portion among the first transmittance electrodes is applied with a sixth electrical signal having a fourth electric potential that is lower than the standard electric potential by a third value, and wherein the third value is greater than the first value.

16. The display module of claim 15, wherein a plurality of fourth capacitors between the portion of the first transmittance electrodes and an electrode of the display panel are configured to store electric energy having a fourth energy value, wherein a plurality of fifth capacitors between the other portion of the first transmittance electrodes and the electrode of the display panel are configured to store electric energy having a fifth energy value, wherein a plurality of sixth capacitors between the second transmittance electrodes and the electrode of the display panel are configured to store electric energy having a sixth energy value, wherein a plurality of seventh capacitors between the third transmittance electrodes and the electrode of the display panel are configured to store electric energy having a seventh energy value, and wherein a sum of the fourth energy, the sixth energy and the seventh energy divided by the fifth energy is 0.95 or greater and 1.05 or less.

17. The display module of claim 15, wherein first receiver electrodes among the plurality of receiver electrodes are applied with a seventh electrical signal having the first electric potential at a third point that is different from the first point and the second point, wherein second receiver electrodes adjacent to the first receiver electrodes among the plurality of receiver electrodes are applied with an eighth electrical signal having the second electric potential at the third point, wherein a portion of third receiver electrodes adjacent to the second receiver electrodes among the plurality of receiver electrodes is applied with a ninth electrical signal having a fifth electric potential that is less than the standard electric potential by a fourth value at the third point, and wherein the fourth value is greater than the first value.

18. The display module of claim 17, wherein a plurality of eight capacitors between the first receiver electrodes and an electrode of the display panel are configured to store electric energy having an eighth energy value, wherein a plurality of ninth capacitors between the second receiver electrodes and the electrode of the display panel are configured to store electric energy having a ninth energy value, wherein a plurality of tenth capacitors between the portion of the third receiver electrodes and the electrode of the display panel are configured to store electric energy having a tenth energy value, and wherein a sum of the eighth energy and the ninth energy divided by the tenth energy is 0.95 or greater and 1.05 or less.

19. The display module of claim 17, wherein a portion of the first receiver electrodes adjacent to the second receiver electrodes is applied with a tenth electrical signal having the second electric potential at a fourth point that is different from the third point,

wherein the other portion of the first receiver electrodes is applied with an eleventh electrical signal having a sixth electric potential that is less than the standard electric potential by a fifth value, wherein the second receiver electrodes and the third receiver electrodes are applied with a twelfth electrical signal having the first electric potential at the fourth point, and wherein the fifth value is greater than the first value.

20. An electronic device comprising:

a display module comprising a display panel; and an input sensor circuit disposed on the display panel, wherein the input sensor circuit comprises a plurality of transmittance channels extending in a first direction and arranged in a second direction intersecting with the first direction; and a plurality of receiver channels extending in the second direction and arranged in the first direction, wherein each of first transmittance channels among the plurality of transmittance channels is applied with a first electrical signal having a first electric potential that is greater than a standard electric potential by a first value at a first point, wherein each of second transmittance channels adjacent to the first transmittance channels among the plurality of transmittance channels is applied with a second electrical signal having a second electric potential that is different from the first electric potential at the first point, wherein each of a portion of third transmittance channels adjacent to the second transmittance channels among the plurality of transmittance channels is applied with a third electrical signal having a third electric potential that is less than the standard electric potential by a second value, and wherein the second value is greater than the first value.

* * * * *